United States Patent [19]

Hughes et al.

[11] Patent Number: 5,506,950

[45] Date of Patent: Apr. 9, 1996

[54] METHOD AND APPARATUS FOR PRODUCING A THREE DIMENSIONAL REPRESENTATION OF A WIRE HARNESS INTO A TWO DIMENSIONAL PRESENTATION

[75] Inventors: Andrew C. Hughes, Hollis, N.H.; James J. Horne, Melrose, Mass.

[73] Assignee: Computervision Corporation, Bedford, Mass.

[21] Appl. No.: 993,030

[22] Filed: Dec. 18, 1992

[51] Int. Cl.⁶ .................................................. G06F 3/00
[52] U.S. Cl. .......................................... 395/161; 395/919
[58] Field of Search .......................... 395/119–121, 141, 395/155, 157, 161, 119, 137, 127, 133, 137, 138, 155, 161; 382/1, 2, 8; 29/857, 593, 747, 748, 851; 381/1, 8; 140/92.1

[56] References Cited

U.S. PATENT DOCUMENTS

| | | | |
|---|---|---|---|
| 3,946,768 | 3/1976 | Fiorentino | 140/92.1 |
| 4,912,644 | 3/1990 | Aoyama et al. | 364/472 |
| 5,083,369 | 1/1992 | Cerda | 29/857 |
| 5,109,479 | 4/1992 | Williams | 395/125 |
| 5,127,062 | 6/1992 | Cerda | 382/8 |

OTHER PUBLICATIONS

Gorling et al., "Automatisches Erstellen von Verdrahtungsunterlagen fur das Einbausystem SIVAREP A", Erstellen von Verdrahtungsunterlagen, Apr. 1966, pp. 256–258.

Uhl et al., "Einsatz eines Datenverarbeitungssystems zum Erstellen von Verdrahtungsunterlagen", BBC–Nachrichten, Jan., 1968, pp. 12–16.

Laudermann, "Elektronische Datenverarbeitung fur Verdrahtungsunterlagen im Schaltanlagenbau", Industrie–Elektrik +Elektronik, 14 Jahrg. 1969, Nr. 8, pp. 181–183.

Habiger, E. "Lochkartenmaschinelle Aufbereitung von Verdrahtungsunterlagen", Elektrie Heft 7 (1969), pp. 279–282.

Gibbons, R. D., "System mit Industrieroboter fertigt Kabelbaume fehlerfrei", Drahwelt 10, 1983, pp. 277–279.

Scholten, R., "Kabellegen mit eiserner Hand", iee productronic, 29. Jahrgang 1984, Nr. 9, pp. 44–46.

Pehrs, J., "Roboter fertigt Kabelbaume", Electronik 25/13.12. 1985, pp. 182–184.

Primary Examiner—Raymond J. Bayerl
Assistant Examiner—Huynh Ba
Attorney, Agent, or Firm—Wolf, Greenfield & Sacks

[57] ABSTRACT

A computer implemented method for designing a form board for manufacturing a wire harness is used to convert a three dimensional computer representation of a wire harness into a two dimensional model of the harness. The method includes modelling the harness as a plurality of segments and iteratively moving each segment into an unfolding plane. A computer generated representation of the two dimensional model is provided.

34 Claims, 16 Drawing Sheets

METHOD AND APPARATUS FOR PRODUCING A THREE DIMENSIONAL REPRESENTATION OF A WIRE HARNESS INTO A TWO DIMENSIONAL PRESENTATION

BACKGROUND OF THE INVENTION

This invention relates to a computer implemented method for generating a two dimensional drawing for a form board used to assemble a wire harness.

Harnesses are collections of wires that are bundled together. These wire harnesses are used in a variety of products to electrically interconnect components of the product, such as an aircraft engine, an automobile, or a computer cabinet. In a car, for example, a harness (or a plurality of harnesses) incorporates the wiring including connections to the dash board, head lights, battery, tail lights, alternator, starter, auto alarm, and any other electrical components. Some of the sections of the harness comprise single wires, and other sections comprise bundles of wires. Most of the wires terminate with a connector or adaptor which is to be coupled to an electrical component.

Typically, harnesses are pre-assembled in a generally two dimensional manner in which all the wires are laid out flat on a form board. The form board is a flat board with pegs, and is manually produced from a completed prototype of the product. The pegs are positioned so that wires run along the board, kept in position by the pegs. A designer removes the harness from the prototype and places them on the form board. The designer manually flattens the three dimensional harness to a two dimensional arrangement, and puts the pegs in the appropriate places. The designer's goal is generally to flatten the harness on a form board so that no two branches of the harness overlap. From this layout, a two dimensional design for a master form board is made. Other harnesses are assembled from the master form board by laying out wires and wire bundles on top of the master form board to create the finished harness in flattened form, and then mounting the flattened harness and installing it on the actual product of which it is a part.

By generating a two dimensional design, a harness can be assembled independent of the product. Consequently, the harness can be contracted to businesses which specialize in harnesses and replacement harnesses can be produced. Assembling a harness in three dimensions would be difficult.

Many products having wire harnesses are designed with computer aided design (CAD). According to a typical method for producing a harness, a product is initially designed with CAD, and a physical prototype, including wiring, is built from the design. The harness is manually removed from the prototype and manually flattened to produce a layout design for assembling future harnesses. It would be beneficial to be able to use CAD techniques to allow a designer to directly produce a two dimensional harness design from a three dimensional model.

It is an objective of the present invention to provide an improved method for manufacturing a harness.

It is another object of the present invention to manufacture a harness without having to build a prototype and manually produce a harness.

It is yet another object of the present invention to provide a method for manufacturing a harness that takes into account the concerns of a harness manufacturer.

SUMMARY OF THE INVENTION

These and other objects and advantages are achieved with a computer implemented method for designing a two dimensional representation which can be used to manufacture a three dimensional wire harness. The method comprises the steps of generating a computer representation of a three dimensional wire harness and defining a two dimensional unfolding plane. At least a portion of the representation is modelled as a plurality of segments, and each segment not in the unfolding plane is moved into the unfolding plane resulting in an unfolded representation. At least some of the segments are rotated relative to an adjacent segment. In the resulting unfolded representation the lengths of the three dimensional model are substantially equal to the lengths of the two dimensional model.

In preferred embodiments, the step of defining a two dimensional unfolding plane comprises the steps of determining a best fit plane through selected points in the three dimensional computer representation. Alternatively, the step of defining a two dimensional unfolding plane comprises determining which plane contains the most segments.

The method may further comprise defining a set of constraints; and after each segment is unfolded, checking the set of constraints to determine whether one or more of the constraints is violated by unfolding the segment. The set of constraints can include a chord limit to insure that the lengths of the computer representation and the lengths of the modelled portions are substantially equal. The set of constraints may also include a twist limit parameter which determines how much a segment (or wire or bundle) can be rotated relative to another segment. This twist limit parameter can be expressed as an angle of rotation per unit of length.

The entire harness can be modelled as a plurality of straight line segments prior to the unfolding step; or each planar curve can be considered as a section prior to unfolding. Instead, a portion of the harness, such as a branch, can be modelled as a plurality of segments, and each segment can be unfolded, and the modelling step is again performed for a next portion of the harness.

The method may further comprise a step of providing a human readable representation of a harness which can be used to generate a form board drawing suitable for manufacturing.

The computer representation represents a plurality of wires which meet at junctions. At the end of a wire is a connector. A branch is a portion of the representation which has both ends terminating at a junction or a connector. The invention also features a method comprising the following steps:

(a) defining a two dimensional unfolding plane;

(b) modelling a portion of a branch as a plurality of segments, said portion including part or all of a branch;

(c) unfolding the portion by moving segments in the portion until each segment is in the unfolding plane, resulting in an unfolded portion;

(d) determining whether the unfolded branch violates any predetermined constraints; and (e) in response to a determination that no constraint has been violated, repeating steps (b)-(d) until all the branches have been unfolded.

In preferred embodiments, the invention further comprises a method for determining whether a cycle exists—a cycle occurring when two or more branches form a closed loop—and unfolding the cycle. This can be done by finding a best fit plane through the junctions which define the closed loop; rotating the closed loop relative to the unfolding plane by an angle equal to the angle between the unfolding plane and the best fit plane; and projecting (e.g., along a perpendicular) any junctions not in the best fit plane onto the unfolding plane so that the lengths of the branches prior to the rotating step are substantially equal to the lengths of the branches after the projecting step.

Alternatively, the method for fixing the closed loop comprises disconnecting one of the branches; unfolding all the branches in the cycle; and reconnecting the disconnected branch so that it has substantially the same length as prior to being disconnected.

The method may further comprise defining a twist limit parameter, in terms of an angle per unit length of wire. For each segment which is moved relative to another, the method includes determining an amount of twist in at least one other segment; and comparing the amount to the twist limit parameter. The accumulated twist for the branch can also be determined. The unfolding step may also comprise moving each segment so that the relative angles between successive segments prior to and after being moved into the unfolding plane are substantially equal, provided that the twist limit parameter is not exceeded. The unfolding step may comprise moving each segment so that the relative angles between successive segments prior to and after being moved into the unfolding plane are as close as possible so that the twist limit parameter is not exceeded.

The segments can be straight line segments, or planar curves. When the segments are straight lines, a parameter can be defined to insure that the modelled branch is substantially equal in length to the branch prior to the modelling step.

The present invention allows a user to design a product and to generate a form board for a harness for the product without having to build a prototype with a harness, and to manually remove and flatten the harness. This will decrease the time it takes to produce a finished product from a design concept. The method described achieves this while using constraints which take into account the physical properties of the harness and the needs of the harness manufacturer.

Other feature and advantages will become apparent from the following description and from the claims.

DESCRIPTION OF THE PREFERRED EMBODIMENTS

Figure 1A:
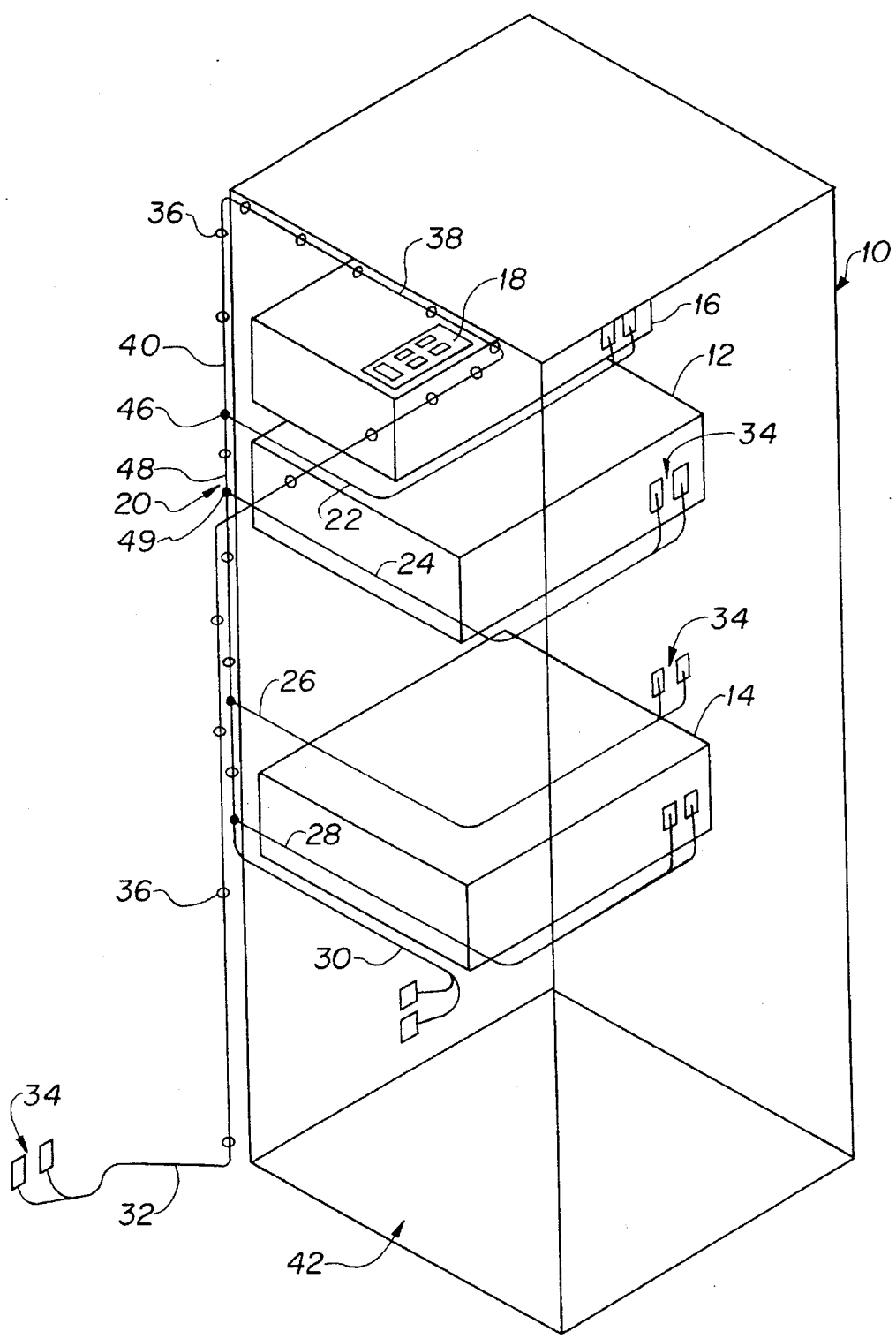
FIG. 1(a) is a CAD generated pictorial view of a cabinet having a harness.
Figure 1B:
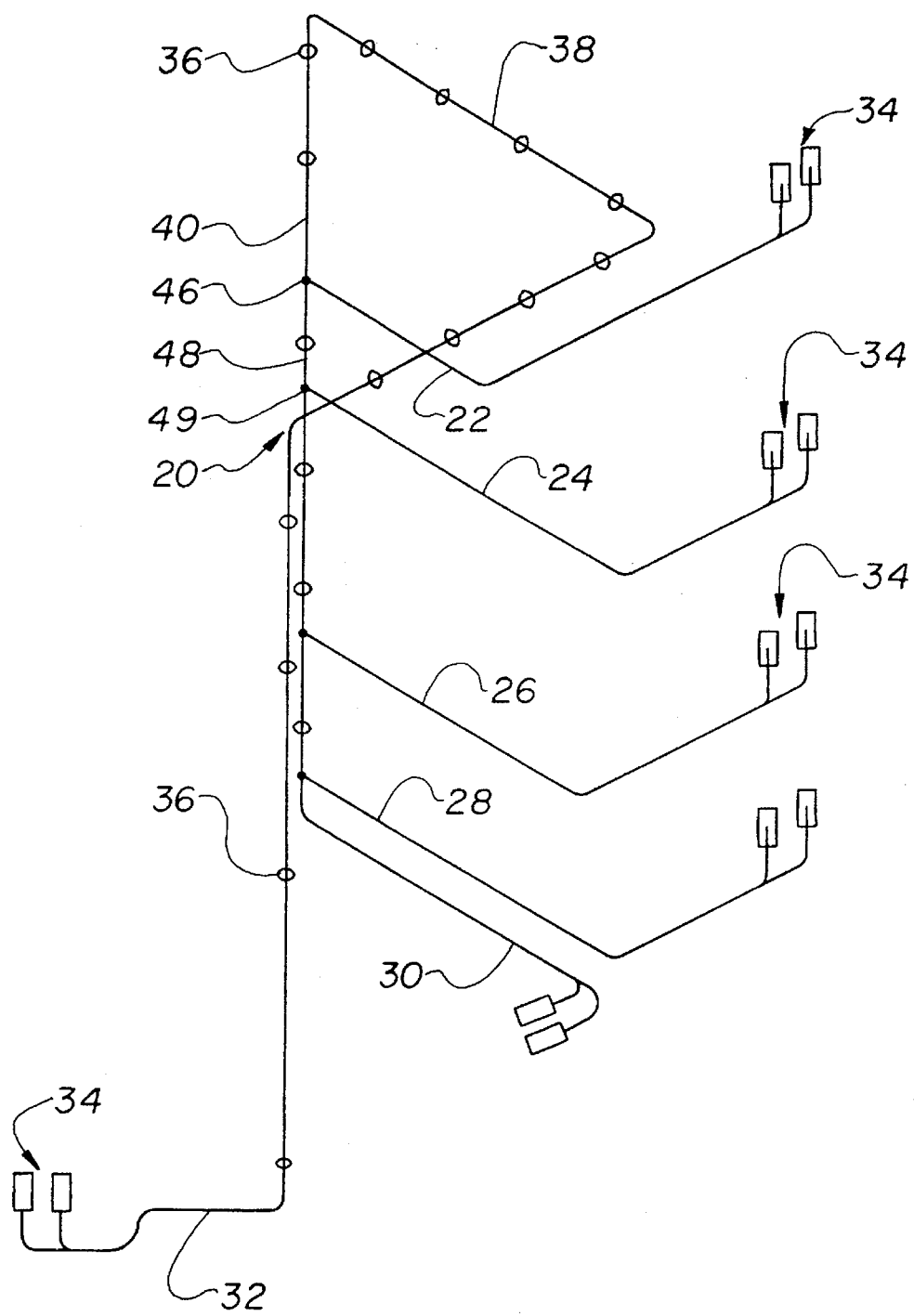
FIG. 1(b) is a pictorial view of the harness in FIG. 1(a) without the cabinet.
Figure 2:
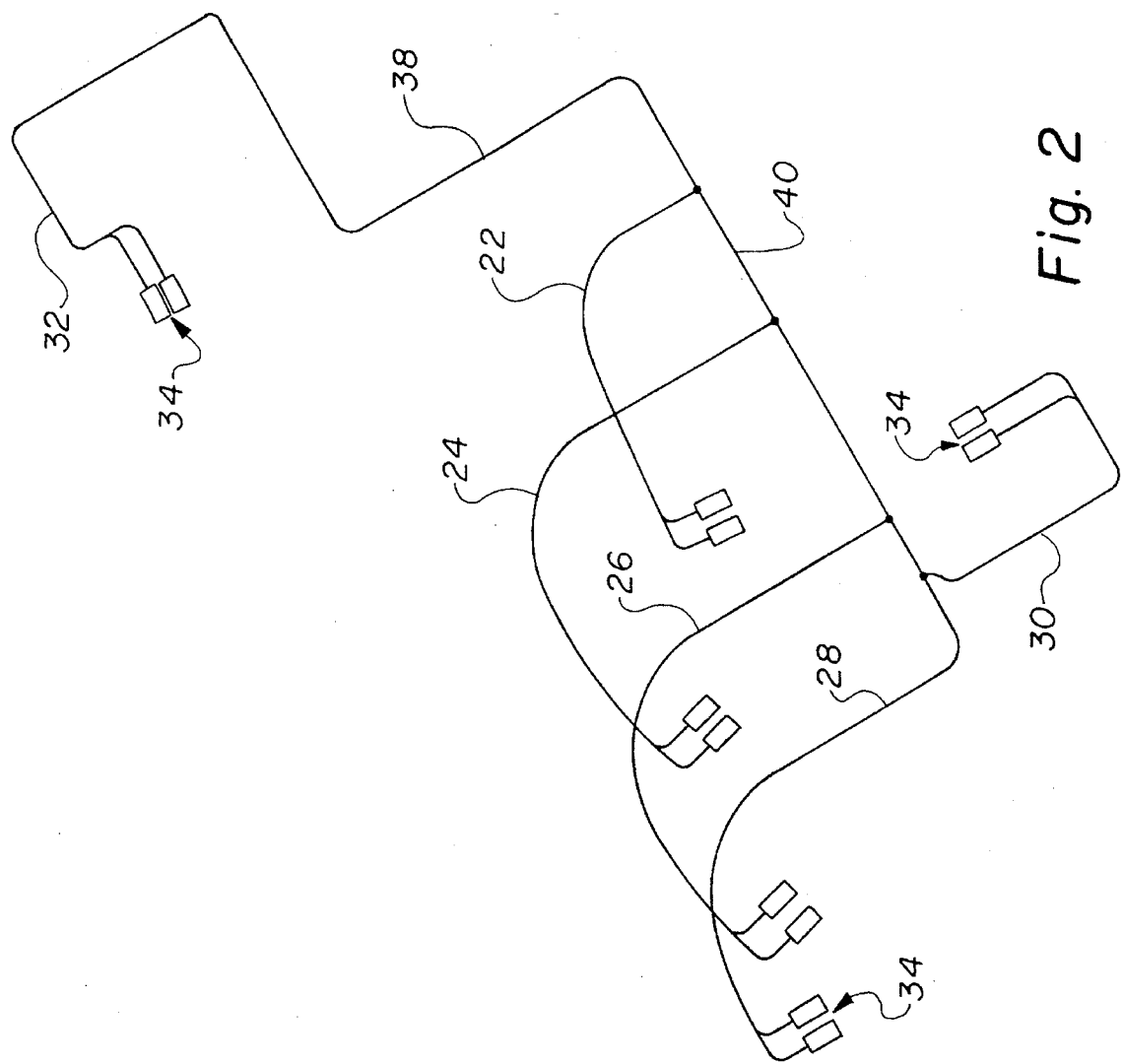
FIG. 2 is a schematic of the harness shown in FIG. 1 which has been unfolded in accordance with the present invention.
Figure 3:
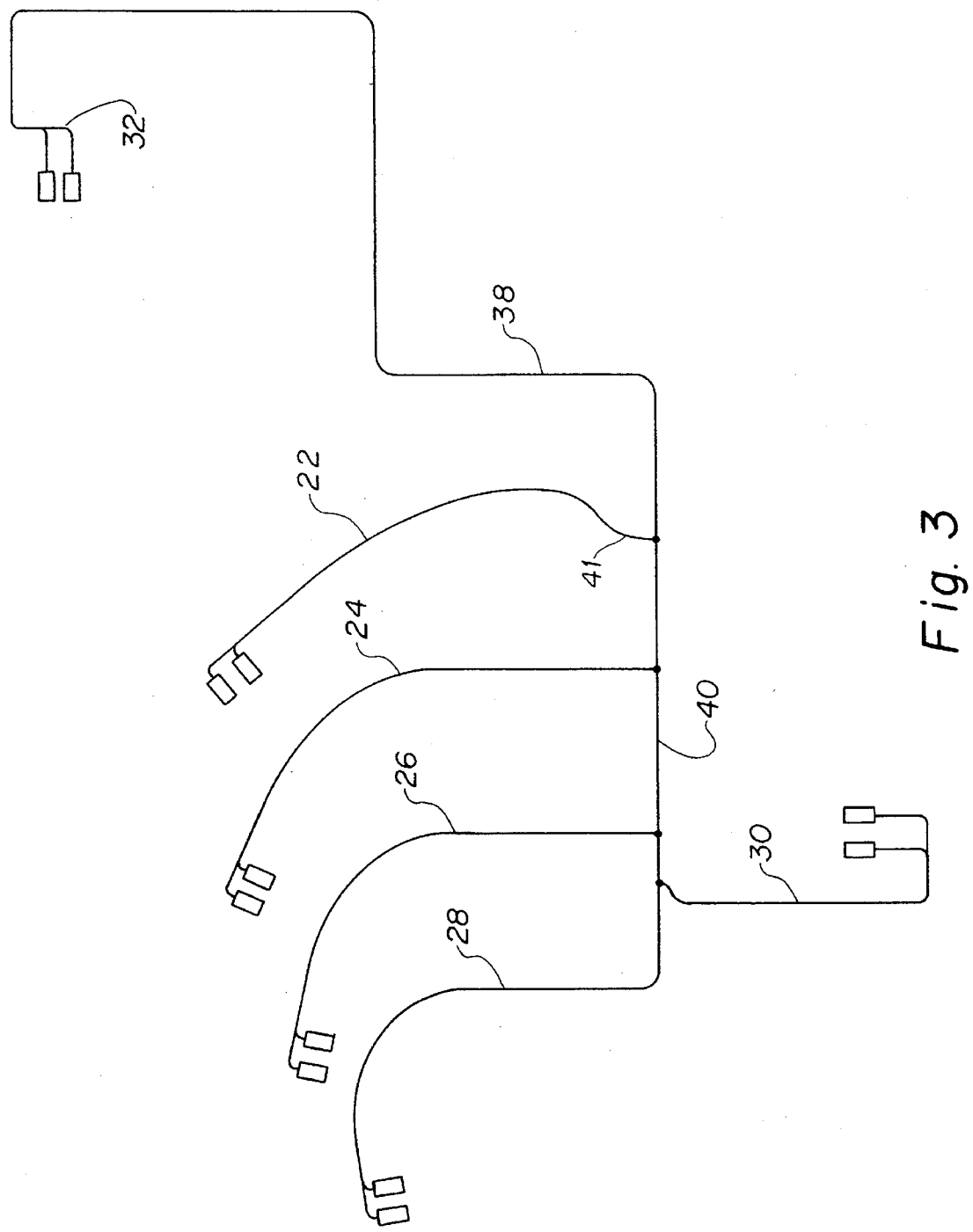
FIG. 3 is a schematic of an edited version of the unfolded harness of FIG. 2.
Figure 4:
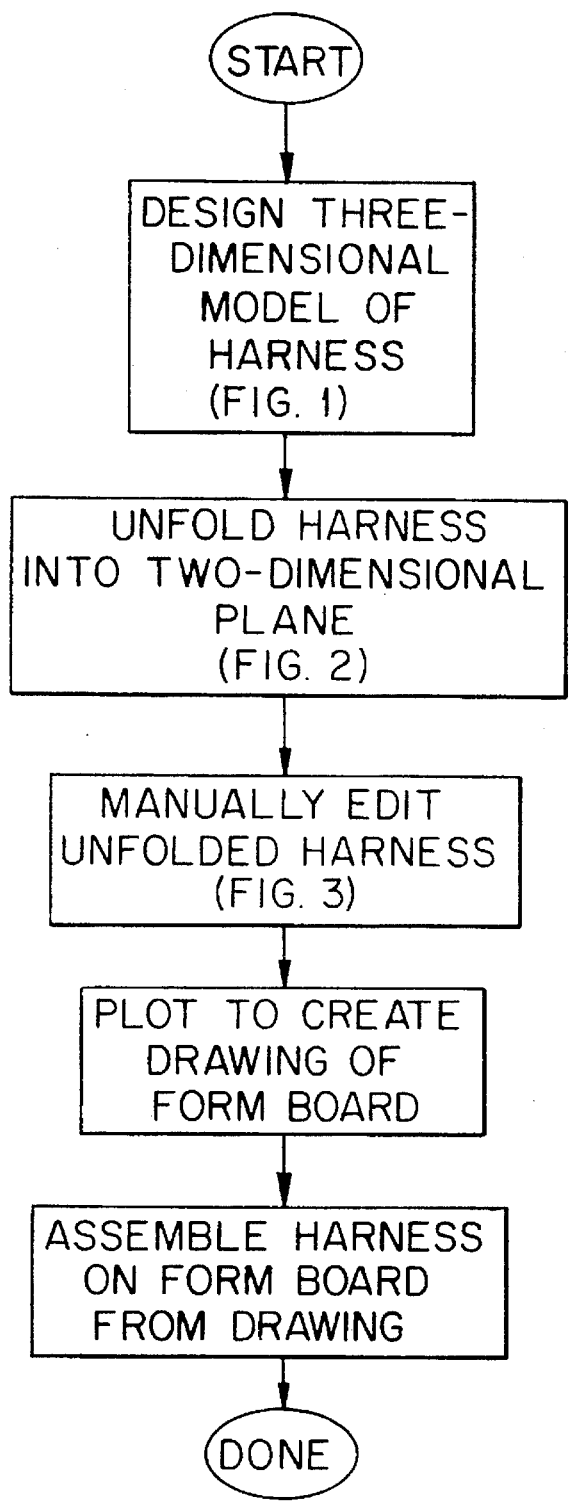
FIG. 4 is a flow chart for manufacturing a harness on a form board in accordance with the present invention.

An overview of a process for designing a form board is shown in the flow chart of FIG. 4, which should be read in conjunction with FIGS. 1–3. Referring to FIG. 1, several electrical components 12, 14, and 16 are arranged in a vertical stack and are mounted in cabinet 10. These components may incorporate a number of electrical subcomponents, such as circuit board 18. These components and others (not shown) are electrically coupled with a harness 20. The harness 20 has a number of branches 22, 24, 26, 28, 30, and 32. At one end of each of these branches is a connector 34, and at the other is a junction. A junction is a connection where at least three branches meet. For example, at the junction 46, branches 40, 48, and 22 each terminate at one end. Branch 48 terminates at its other end at another junction 49. A branch is a section of the harness which terminates at each end with a connector or a junction. The harness is physically coupled to the cabinet with clips 36. In some products, branches may be relatively loose, while in other applications, the wires should be clipped tightly within the product.

All branches of the harness are shown here as single lines. In some sections of the harness, a branch may be a single wire, while in other sections, a branch is a bundle of wires. These bundles may be wrapped with a cord, tape, or clamps.

The two dimensional representation of the three dimensional cabinet and harness shown in FIG. 1 can be produced with a CAD system. A harness is designed for the particular product, and is electronically removed from the product using standard CAD techniques, as represented in FIG. 1(b). Referring to FIG. 2, in the present invention, after the three dimensional harness is removed from the model of the product, a computer implemented process unfolds the harness into a two dimensional unfolding plane with branches corresponding to those shown in FIG. 1. Unfolding is defined as the process for moving the three dimensional harness, or a part of it, into a two dimensional plane defined as the unfolding plane to create a form board drawing, as shown in FIG. 2. Unfolding generally includes a process of rotating which is discussed below. A form board can then be manufactured by plotting the generated form board drawing and mounting the paper plot on a form board.

In order to unfold, the harness is divided into a plurality of smaller portions called segments. In one embodiment, prior to any unfolding, the harness is divided into a large number of straight line segments. Alternatively, a portion of the harness, such as a branch, can be modelled as a plurality of straight line segments and then unfolded. A next portion or next branch is modelled as straight line segments and the next portion is unfolded. This process is repeated until all of the portions of the harness are unfolded. In another embodiment, the harness may be modelled as a plurality of planar curves instead of straight line segments. The planar curves, i.e., any curve in one plane, may be determined initially, all at one time, or in portions as described above.

Figure 5A:
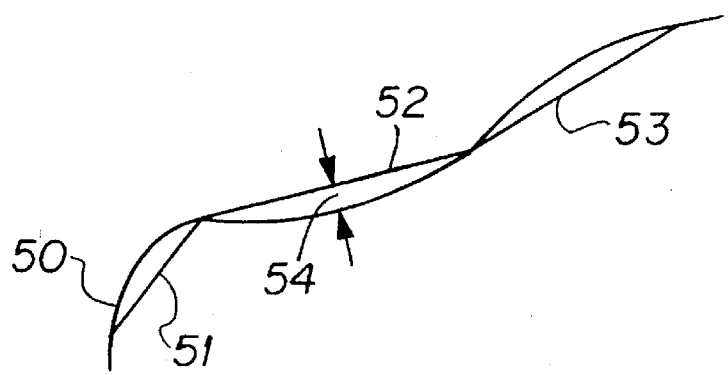
FIGS. 5(a)–(b) and 6(a)–(b) are graphs of segments used to demonstrate parameters used in accordance with the present invention.

When the harness is unfolded, certain constraints are observed. The most important constraint is that the length of each branch not change. If the lengths of actual wires or bundles does change, it may be impossible to couple the branches of the harness to the equipment in the product. A chordal tolerance parameter is defined to help control the accuracy of the branch lengths when curved branches are modelled with straight line segments. Referring to FIG. 5(a), if a bundle or wire 50 defining a curvilinear path is approximated by straight line segments 51, 52, and 53, the chordal tolerance is the maximum perpendicular distance 54 between the straight line segment (or chord) 52 and curve 50. The larger the radius of curvature, the longer the chord can be without violating the chordal tolerance limit.

Figure 5B:
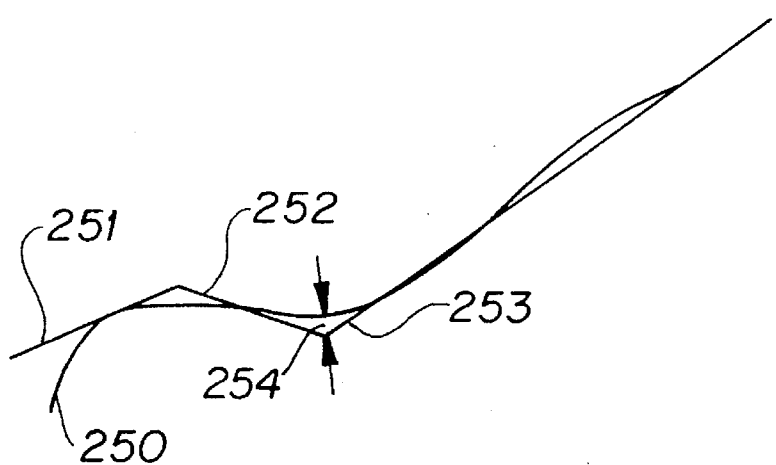

Other known methods can be used to approximate the curved wire 50. Referring to FIG. 5(b) for example, the wire 250 can be modeled with segments 251,252, and 253 which have tangents on the curve. The chordal tolerance 254 is similarly determined and compared to the limit. As another alternative (not shown), the segments may have neither vertices nor tangents on the curve.

Another constraint relates to the curvature of the harness. Preferably, the angles of the wires or bundles on a two dimensional form board should be as close as possible to the relative angles of the wires on the three dimensional product. When an actual harness is physically removed from a form board, it tends to maintain the shape it assumed while it was on the form board. Consequently, critical bends in the three dimensional harness should be represented as closely as possible on the two dimensional form board to insure proper installation of the harness in the product with minimum stress due to bending of the harness during installation.

Another constraint exists because most wire can only be twisted by a limited amount over a given distance, depending on the type and size of the wire is a three dimensional harness is physically unfolded into a two dimensional plane, wires and bundles are rotated causing twists which create stress in the wires. Consequently, a twist limit is defined. The twist limitation can be determined in a number of ways: it can be a constant value for all harnesses; based on the smallest allowable twist for any wires; or it may be calculated as a function of the bundle diameter. Preferably, each of these twist values is evaluated and the smallest twist value is used.

Figure 6A:
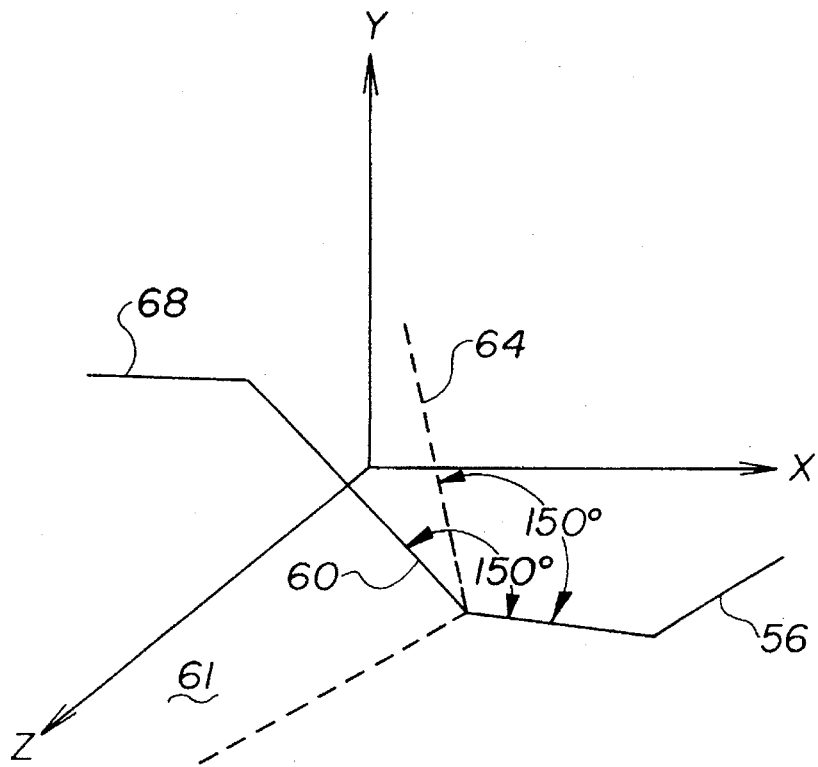
Figure 6B:
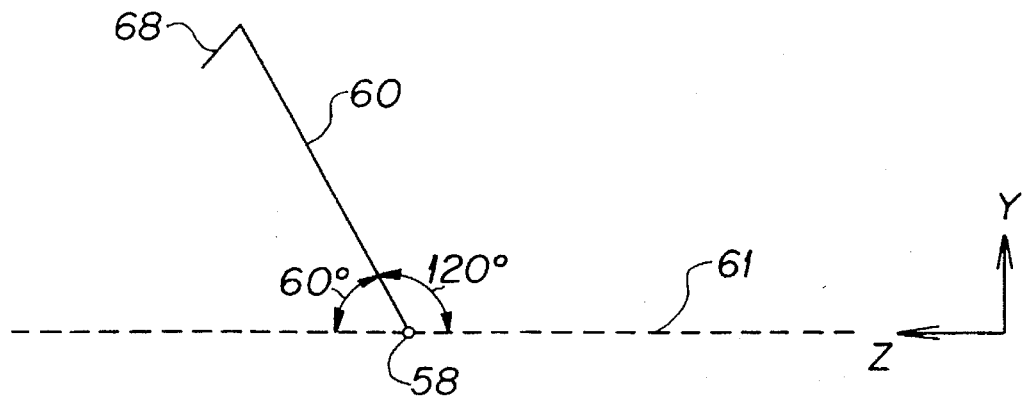

Referring to an example in FIGS. 6(a)-6(b), a segment which is not in the unfolding plane is unfolded by being rotated relative to an adjacent segment to get it into the unfolding plane. In the example, the X-Z plane 61 is the unfolding plane, and the segments 56 and 58 are in the unfolding plane. The segment 60 has a Y-component and is outside the unfolding plane at a 150° angle with respect to the segment 58. If these segments are physical wires, when the segment 60 is rotated into the unfolding plane 61 relative to the segment 58, a twist is introduced in the wire comprising segment 58. The angle relative to the segment 58 should be maintained, so a segment 64 (which is the unfolded representation of the segment 60) is in the X–Z plane and is at 150° relative to the segment 58.

Referring to FIG. 6(b) which is a side view of the representation of FIG. 6(a) looking into segment 58, the segment 60 is also at 60° with respect to the unfolding plane. The segment 60 could be rotated counterclockwise 60°, or clockwise 120° about the axis defined by segment 58. In general, it is preferable to rotate the segment into the unfolding plane by the smaller angle to introduce less twist.

In some cases, however, it is preferable to twist by the greater angle since twist is determined not only for each segment, but also accumulated over the length of the branch. A twist of −60° over 8.0 inches of a first segment, and a twist of +80° over 10.0 inches in a second segment results in a twist of +20° over 18 inches of the combined segments. Thus, if there is too much twist in previous segments, it may be desirable to twist by the greater angle if the twist in that direction would alleviate the total twist.

After the segment 60 has been unfolded, a next segment 68 is similarly unfolded. When the segment 68 is rotated relative to segment 60, a twist is introduced in the segment 60. The twist limit is checked for the segment 60 and for the aggregate twist in the segments 58 and 60 per total length of the segments 58 and 60. As noted above, it is determined from the twist limit whether to rotate the segment by the greater or lesser angle. This procedure is continued until all the segments are in the unfolding plane.

After all the segments are unfolded, the complete unfolded model of FIG. 2 is manually edited by a user in order to produce a drawing suitable for a manufacturer to assemble a harness. In general, this means that no branches overlap, as shown in FIG. 3, and any other constraints required by a manufacturer. When editing, the user can add to the model clips and ties for holding the bundles together. The resulting edited model is plotted and enlarged (or reduced) to actual size to create a master form board drawing. A harness manufacturer attaches this drawing to a form board to create a master form board which is used to assemble the harness.

Figure 7:
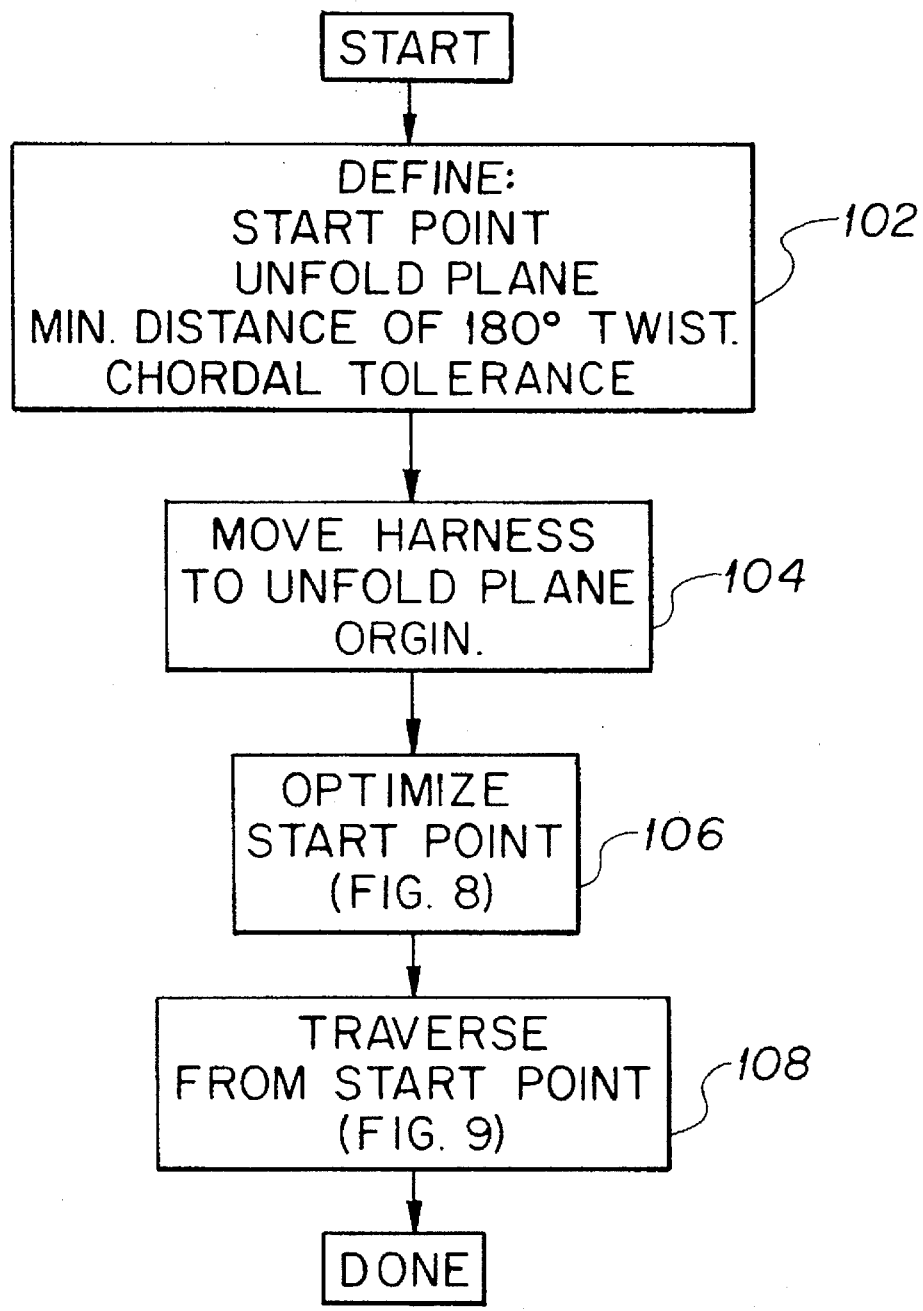
FIG. 7 is a flow chart of an overview of the unfolding method.

Referring to the flow charts depicted in FIGS. 7–14, the method of the present invention will now be described in detail. Referring to FIG. 7, the method for unfolding the harness begins with defining the parameters and the initial positions (step 102). A start point, i.e., the point on the harness from which unfolding will begin, and the unfolding plane are defined. Next, the twist limitation and the chordal tolerance are defined. The twist limitation and chordal tolerance may be entered by a user or can be default values.

When the start point and an unfolding plane are defined, the harness model is moved to a new position so that the start point is at an origin in the plane (step 104). In selecting a start point, it is desirable to begin at a junction where there are a number of coplanar branches to minimize the amount of unfolding. The initial start point may be selected by a user, or may be determined automatically. In FIGS. 1(a)–1(b) for example, the junction 49 or the junction 46 would be good potential start points.

Once the start point is selected (step 108) it is then optimized (FIG. 8) by orienting the harness in the best position to begin unfolding (step 106) as will be described in more detail with respect to FIG. 8. Then, in step 108, a routine begins at the start point and traverses the junctions and branches (as will be described in detail with respect to FIG. 9) by successively rotating segments as demonstrated in FIGS. 6(a)–(b) until each branch lies in the unfolding plane.

Figure 8:
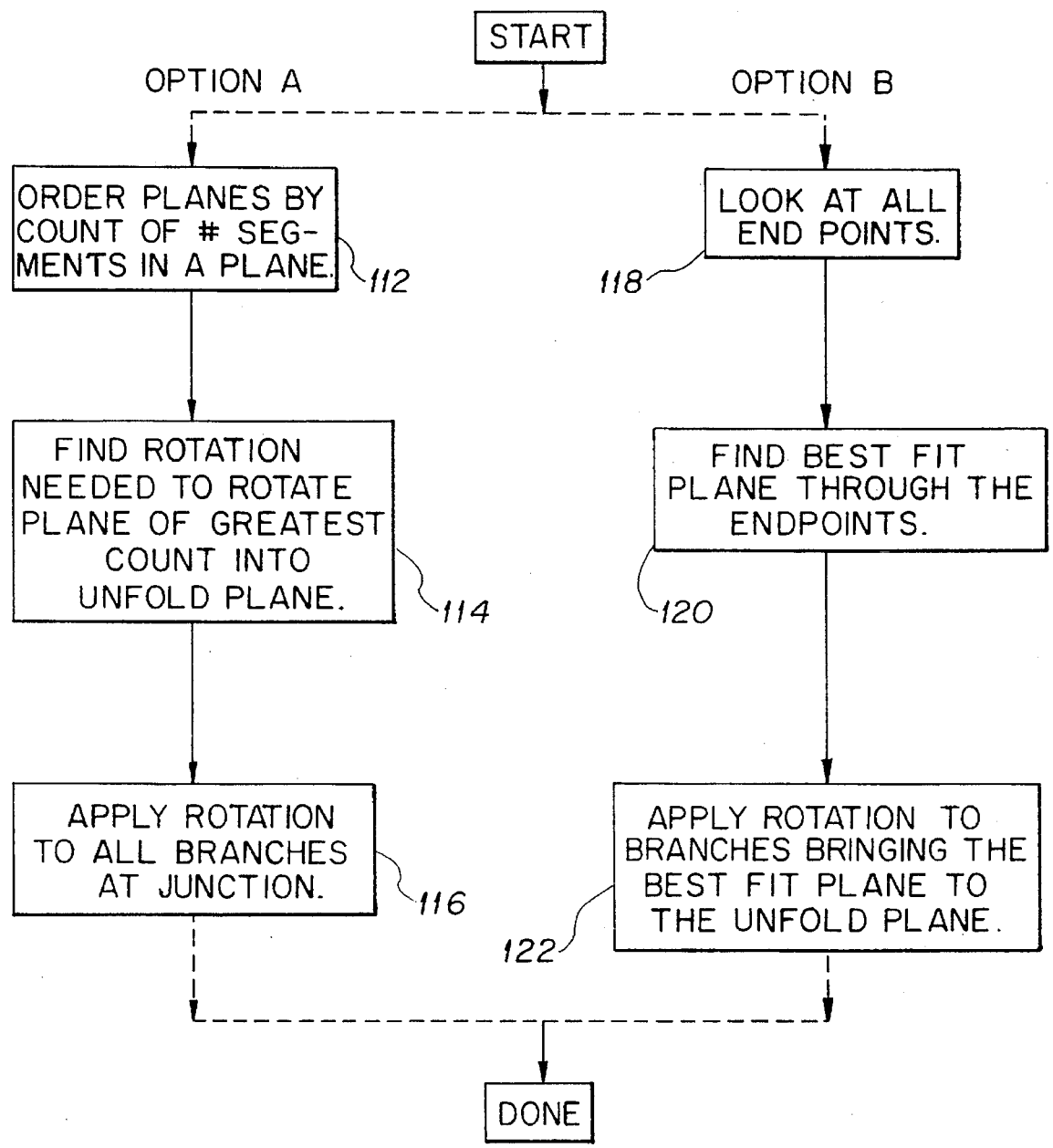
FIG. 8 is a flow chart of a routine to optimize the starting point.

Referring to FIG. 8, there are two options for optimizing the start point. Under option A, the number of segments is counted in each potential plane through the segments in each branch immediately connected to the start point (step 112). When the plane with the maximum number of coplanar segments is found, the harness is rotated relative to the unfolding plane so that this plane is in the unfolding plane (steps 114, 116), i.e., the plane with the maximum number of branches corresponds to the unfolding plane. Referring again to FIGS. 1(a)-1(b) as an example, assuming that junction 46 was selected as the start point, and that the initial segments from branches 22, 40, and 48 are in the same plane as the side 42 of the cabinet, this plane would be selected as the optimum start plane.

Under option B, all of the end points are located (step 118), and a best fit plane is found through each of these end points (step 120). Methods to find the best fit plane are generally known, and are analogous to two dimensional curve fitting, e.g., methods such as a sum of least squares algorithm. The harness is then rotated so that the best fit plane corresponds to the unfolding plane (step 122).

Figure 9:
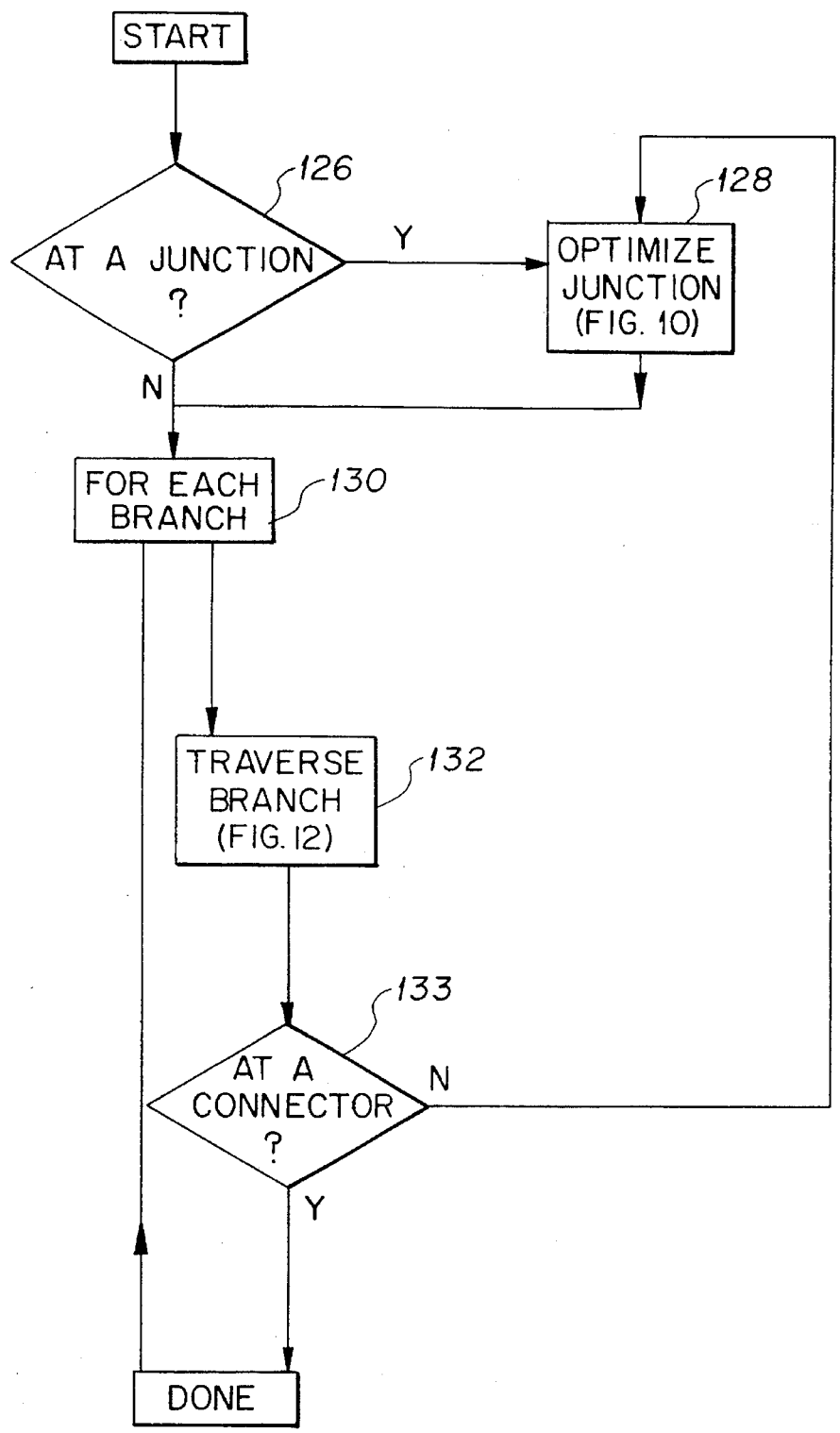
FIG. 9 is a flow chart of a traverse routine.

FIG. 9 shows in detail a flowchart corresponding to step 108 in FIG. 7. To traverse the harness, it is first determined whether the routine is at a junction (step 126). If so, a routine is called to optimize the junction (step 128). If the routine is not at a junction, or after the junction has been optimized, a routine is called to traverse each branch (steps 130, 132). The traverse routine traverses each branch without repeating any branches. In general, the ability to perform a function along a tree-like structure without repeating is known to graph theory techniques in computer science. At the end of the branch, it is determined whether there is a connector (step 133). If it is a connector, then the next branch is traversed (steps 130, 132). If it is not a connector, it must be a junction, so the routine returns to the optimize junction routine (step 128).

Figure 10:
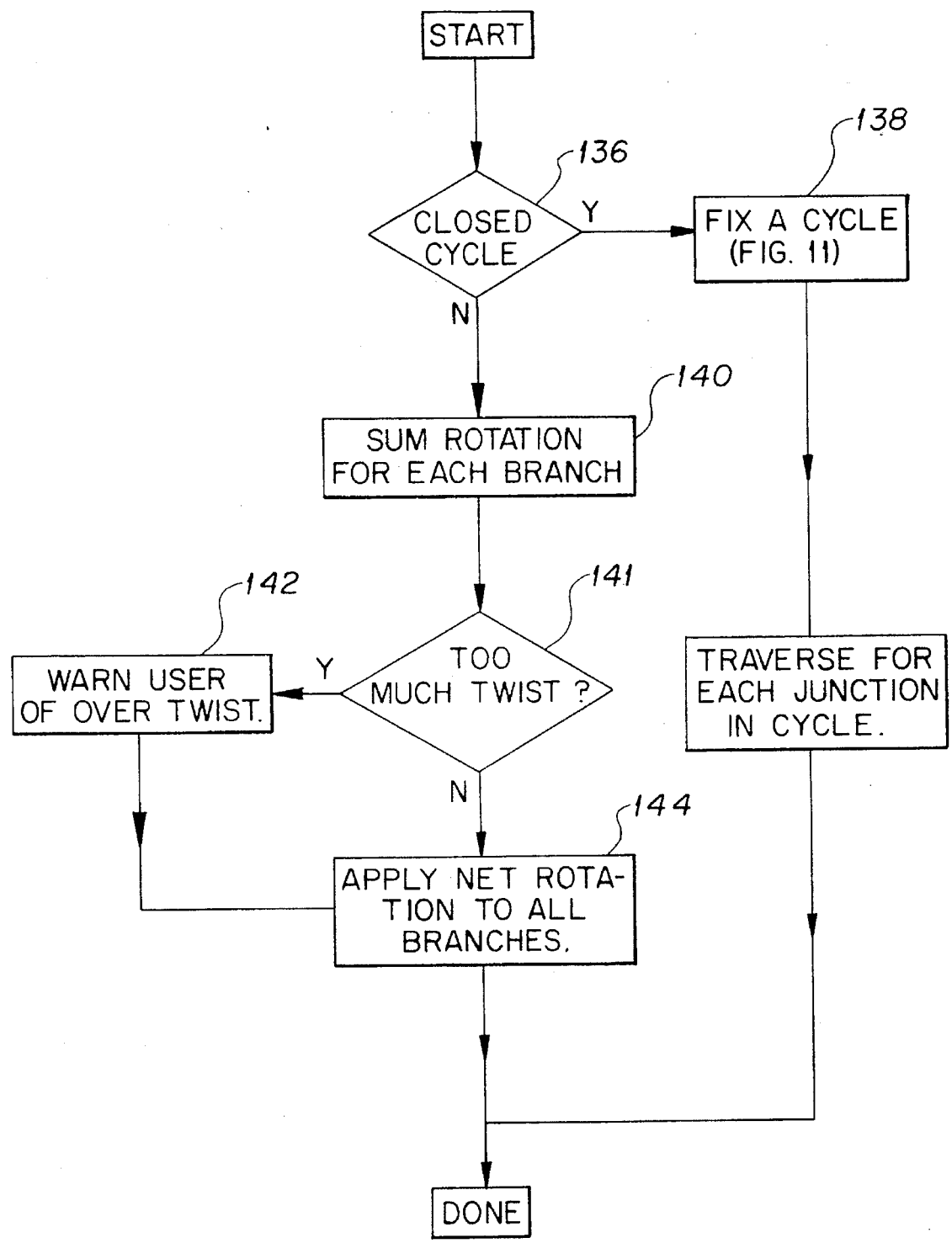
FIG. 10 is a flow chart of an optimized junction routine.
Figure 11:
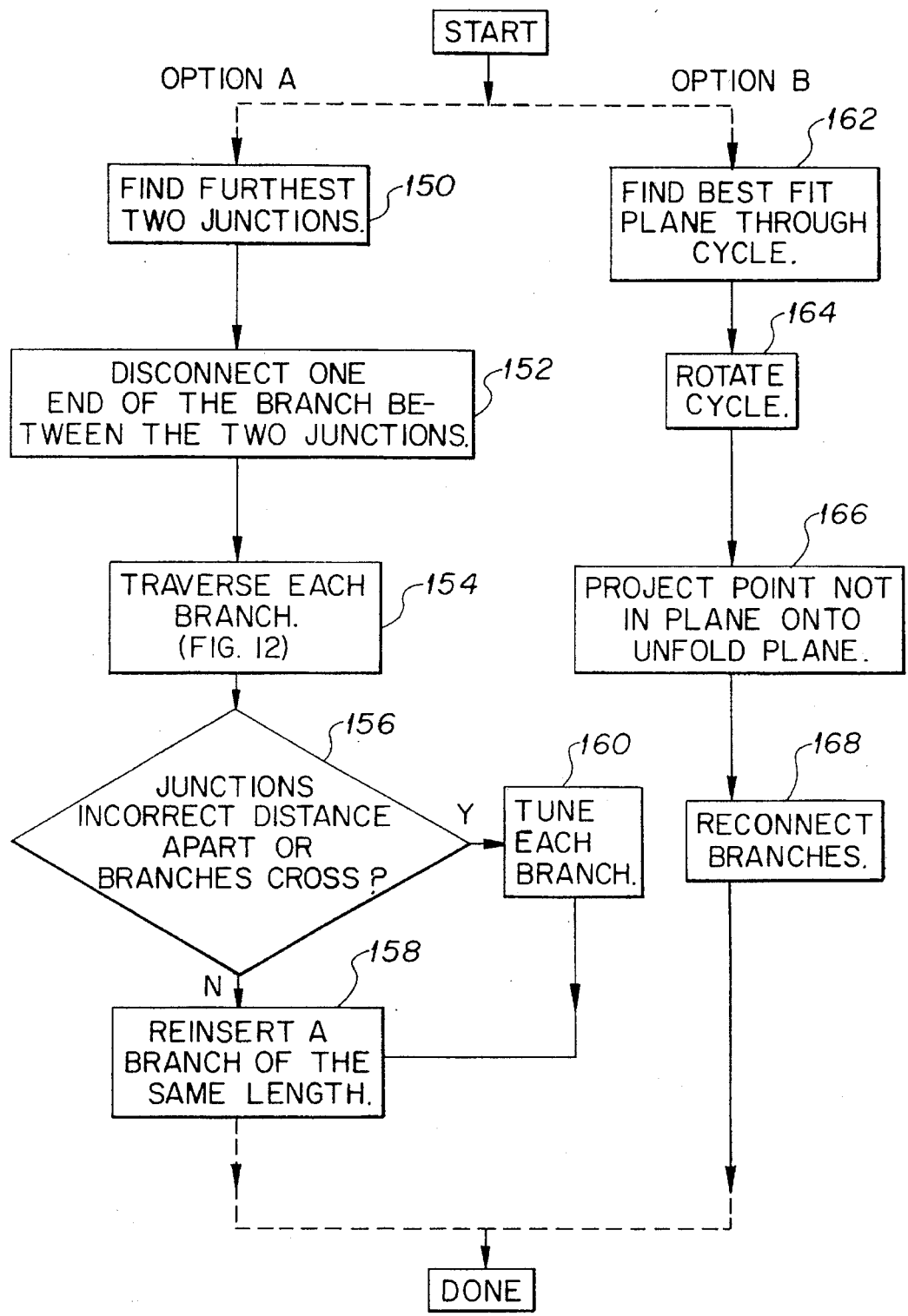
FIG. 11 is a flow chart of two options for unfolding a closed loop or cycle.
Figure 15:
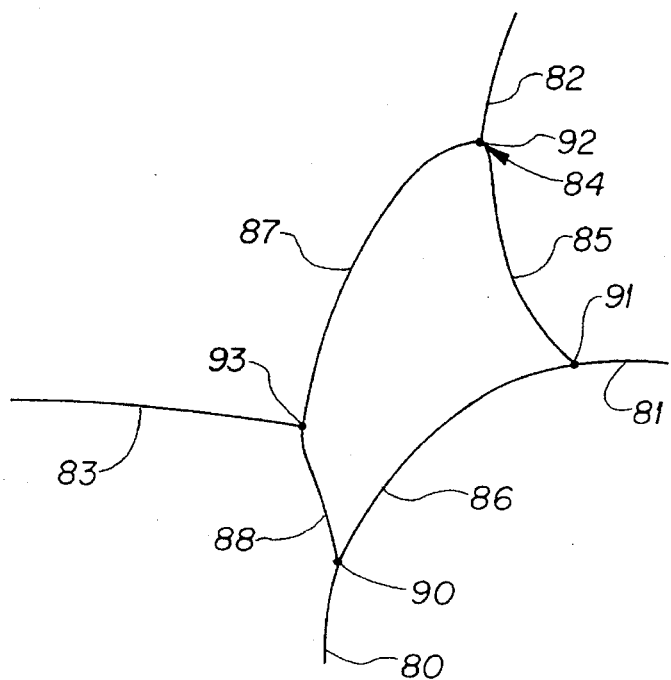
FIG. 15 is a graph of a cycle to illustrate the method for fixing a cycle described with the flow chart in FIG. 11.

Referring to FIG. 10, to optimize a junction (step 128 in FIG. 9), it is determined whether or not there is a closed cycle (step 136), an example of which is shown in FIG. 15. The branches 85, 86, and 88 meet at junctions 90, 91, and 92 and share common wires. In this case, the traverse branch routine will not work, so a routine to fix the cycle as illustrated by the flow chart of FIG. 11 is called (step 138). A cycle may have two or more junctions.

Referring to FIG. 11, there are two options for fixing a cycle. According to option A, the two furthest junctions from the last unfolded segment are found (step 150), and the branch is disconnected between these two junctions (step 152). In FIG. 15, if the branch 80 had just been unfolded up to the junction 90, it would be determined that a cycle was encountered. The branch 85 between junctions 91 and 92 is disconnected at the end 84. The traverse branch routine (FIG. 12) is called (step 154) to unfold branches 86, 88, 85, and 87. After the branches have been unfolded, it is determined whether the junctions 91 and 92 are an incorrect distance apart and whether any branches cross (step 156). If not, a segment of the same length is reinserted (step 160), by reattaching the disconnected branch 85. If junctions 91 and 92 are a different length apart or if any branches cross, each branch is tuned (step 160). Tuning is performed by increasing or decreasing the angle between adjacent segments in the unfolding plane along branches 85, 86, and 87 by small incremental angles. This is done iteratively until the junctions 91 and 92 are as close together as the length of the branch 85 that joined them and until none of the branches cross each other.

Under option B, a best fit plane is found through the junctions of the cycle (step 162). The cycle is rotated into the unfold plane so that the best fit plane corresponds to the unfolding plane (step 164). Since three points define a plane, a closed cycle with three junctions can be unfolded in this manner. If there are four or more junctions, the junctions outside the unfold plane are projected onto the unfold plane, along the perpendicular from the junction to the plane (step 166). The branches are reconnected with best fit splines that have the same length as the original branches (step 168).

Figure 16A:
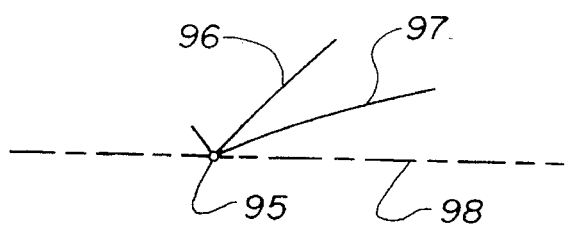
FIGS. 16(a)–16(b) are graphs of a branch and two segments to illustrate the optimizing junction routine shown in FIG. 10.
Figure 16B:
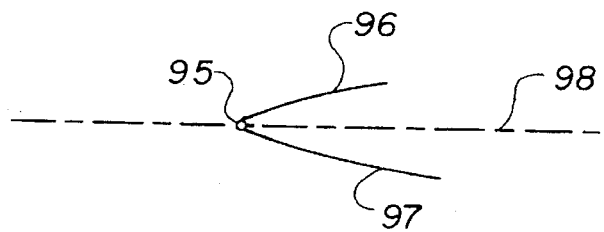

Referring again to FIG. 10, if there is no cycle, the rotation is calculated for the first segment of each branch adjacent to the junction to get the segment into the unfolding plane and so that the total twist to the previously unfolded branch is minimized (step 140). If it is determined that it is not possible to unfold any segment without exceeding the twist limit (step 141), the user is warned that the harness may be overtwisted (step 142). The rotation is applied to the last segment of the last branch which is in the unfolding plane (step 144), and each branch is traversed (steps 130, 132 in FIG. 9). Referring to FIGS. 16(a)-16(b) for example, branch 95 has just been unfolded into unfolding plane 98, and segments 96 and 97 are the first segments of branches coupled to branch 95. These segments are at different angles with respect to the unfolding plane, and are in other planes. The other planes are rotated by the minimum angle necessary to get these segments as close as possible into the unfolding plane (FIG. 16(b)). Thus, the twist added to branch 95 is minimized.

Figure 12:
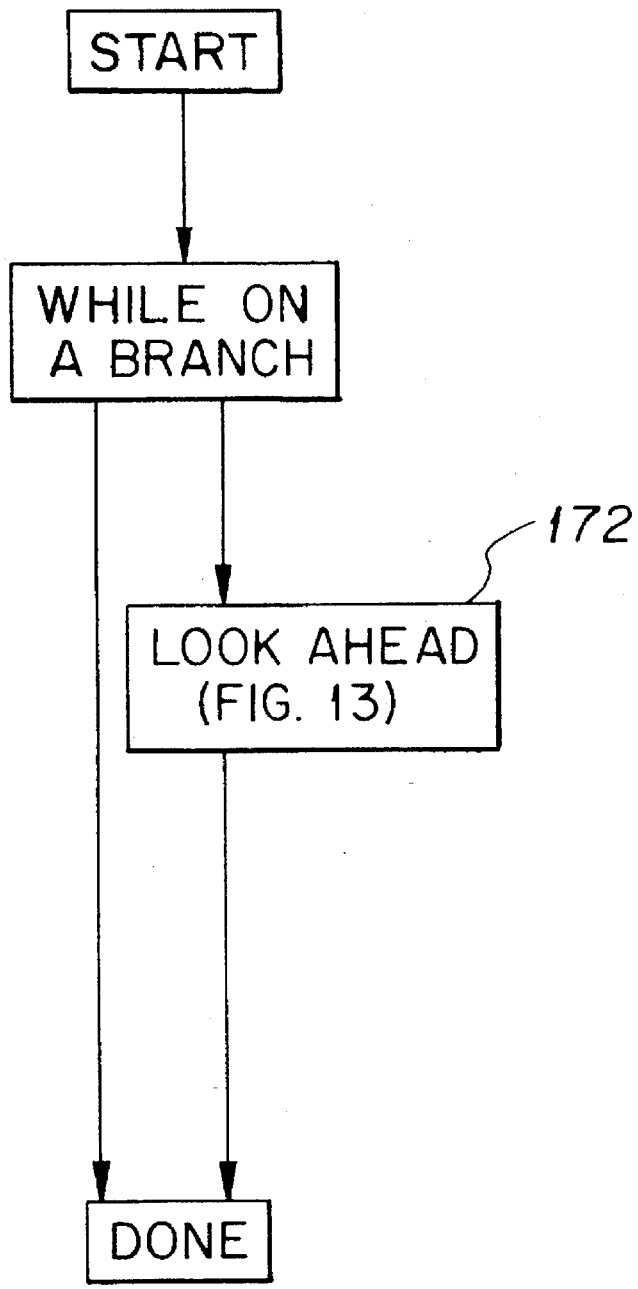
FIG. 12 is a flow chart of a method for traversing a branch.
Figure 13:
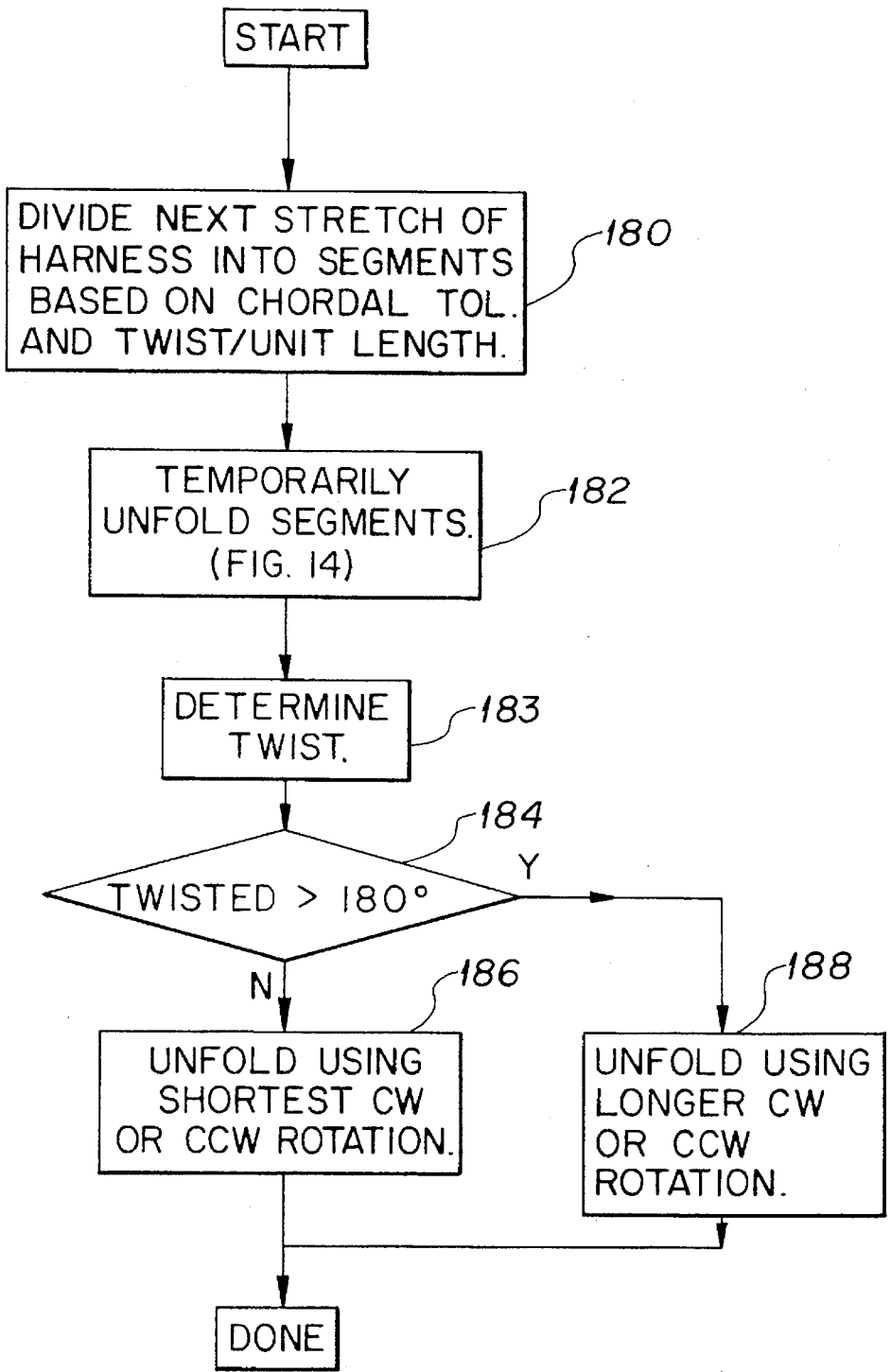
FIG. 13 is a flow chart of a look ahead routine.

Referring to FIG. 12, while on each branch the traverse branch routine looks ahead at a number of segments to determine whether the next segments can be rotated into the unfolding plane (step 172). This procedure is repeated for each branch. Referring to FIG. 13, to look ahead, a next portion of the harness is divided into a number of segments based on the defined chordal tolerance and twist limitations (step 180). The minimum distance that the harness can twist 180° is used to determine the distance along the current branch to look ahead, i.e., if the twist limit is 180°/20 inches, the look ahead routine is performed for the next 20 inches of the branch. This look ahead portion is divided into segments so that there are no violations of the chordal tolerance limitation. There could be one segment or thousands, depending on the harness and its radius of curvature.

In step 182, these segments are temporarily unfolded as will be described in more detail with respect to FIG. 14. The twist is determined (step 183), and it is determined whether or not the twist is greater than 180° (step 184). If not, the segment is unfolded using the smallest rotation needed to get the segments in the unfold plane (step 186). If the twist is greater than 180°, the segment is rotated the longer distance but in a direction which alleviates some of the twist (step 188), as discussed with reference to FIG. 6(b).

Figure 14:
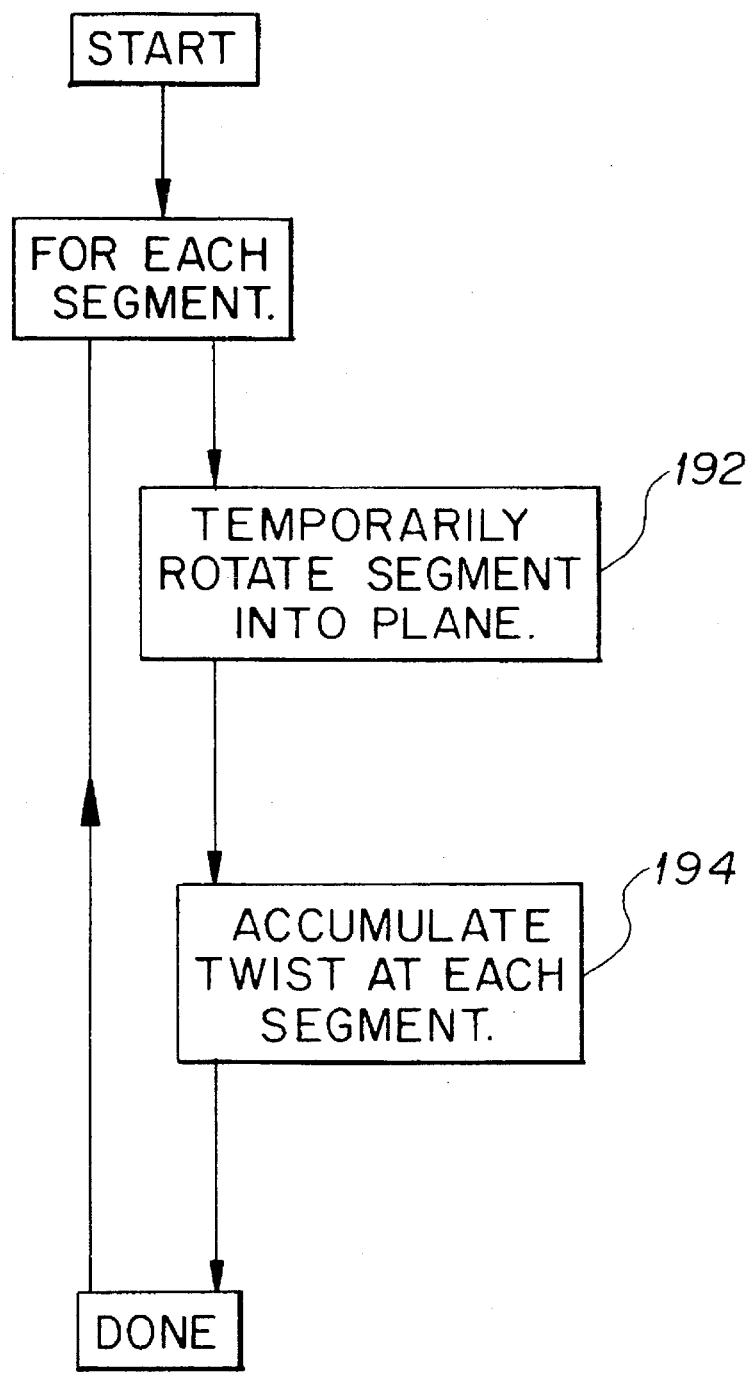
FIG. 14 is a flow chart of the temporary unfolding method.

Referring to FIG. 14, to temporarily unfold, each segment is temporarily rotated into the unfolding plane (step 192), and the accumulated twist at each segment is determined (step 194). The segments are unfolded by rotating in the direction to produce the minimum total twist.

The unfolding method described in FIGS. 7-14 produces a two dimensional model such as that shown in FIG. 2. In FIG. 2, branches 22, 24, 26, and 28 overlap. This is generally undesirable because it is more difficult to manufacture a harness with overlapping branches, so the unfolded model is edited by a user. A number of well known CAD techniques can be employed. For example, branches can be rotated about a given point, angles can be adjusted, harness elements can be mirrored, and a harness can be rotated within the unfolding plane. Referring to FIGS. 2 and 3, for example, the branch 22 has had a new curve 41 added to it so that it does not overlap with branch 24. In branches 24 and 26, the bend angles have been increased so that they do not overlap branches 26 and 28, respectively. Finally, the entire design has been rotated, resulting in the representation of FIG. 3. This representation can be used with a form board to assemble a harness for the cabinet shown in FIG. 1.

Other embodiments are within the following claims. For example, as noted above, the segments can be planar curves, not necessarily straight line segments. In this case, a curve in a single plane is rotated into the unfolding plane relative to the previous planar curve, and the twist is calculated over the previous planar curve.

The code for an embodiment of the present invention is provided in an appendix. This embodiment does not include all of the features described herein.

What is claimed is:

APPENDIX unfldhrn Page 1

```
<#
<############################################################
<#
    PROC UNFLDHRN($view,$cnod,$nlin,$entlist,e,@last,last,lastang)
<#
<############################################################
<#
<#
<#  Purpose.
<#
<#  This procedure recieves as arguments a nlin and cnod miptr, and a list
<#  of entities affected by any changes to the nlin.  The procedure flattens
<#  the nodal line onto cpl top retaining its original length and angles
<#  as closely as possible.
<#
<#  All of the entities at the end of the nodal line are then translated and
<#  rotated in order to maintain their relationship to the nodal line.
<#
<#
<############################################################
<#
<#  Declare arguments.
<#
    DECLARE ENTITY $cnod,$nlin,$entlist(1000)
    DECLARE REAL ents
    DECLARE LOCATION @last
<#
<#  Declaratiuonms
<#
    DECLARE LOCATION @coords(100)        <# Nodal line coords list.
    DECLARE LOCATION @new(100)           <# New coords of the nodal line.
    DECLARE LOCATION @temp1(2),@temp2(2),@temp3(2),@temp4(2),@line(2)
    DECLARE ENTITY $temp(4)
    DECLARE REAL ncoord,idata(20),nprp
    DECLARE TEXT &prop(20:72)

DECLARE REAL zoom
    DATA zoom /100/
<#
<############################################################
<#
    <# DISP OFF
    WHEN init = 0
       @org1=VECT(-0.001,0,0)
       @org2=VECT(0,0,0)
       init = 1
       factor = 1
       WHILE trap = 0
          PRINT
          &a = '0.001'
          PRINT  Please enter trap size to be used [{&a}].
``` unfldhrn Page 2

```
        READ (      - > )&a
        ERTRAP   TRAPS
          trap - &a
        #TRAPS CONTINUE
    ENDWHILE
    REPEAT
        PRINT
        PRINT     1,  Use actual lengths,.
        PRINT     2,  Use LENGTH property value.
        PRINT
        READ (      - > )&a
        ERTRAP   SET
            fact - &a
        #SET UNTRAP
    UNTIL fact - 1 .OR. fact = 2
    WHEN fact - 1
        PRINT
        &a = '1'
        PRINT  Please enter scaling factor [{&a}]
        READ (      - > )&a
        ERTRAP   MULT
            factor - &a
        #MULT UNTRAP
    ENDWHEN
    PRINT   Scaling factor  is {factor}.
    ! <^U>
    EXECDF
ENDWHEN OBT/RECPTR=$cnod,IWANT,1,COORDS,@cnod
OBT/RECPTR=$nlin,IGOT,nc,COORDS,@coords
magcn - MAGN(@cnod)
magnl - MAGN(@coords(1))
WHEN magcn - magnl > .1 .OR. magcn - magnl < -.1
    !!EDIT NLIN REV: MIP {$nlin}
    OBT/RECPTR=$nlin,IGOT,nc,COORDS,@coords
ENDWHEN <#
<#   calculate the scaling factor for this nlin.
<#

WHEN fact = 2
    CALLP GETPROP($nlin,idata,&prop,nprp)
    n - 0
    WHILE n =: n + 1 <= nprp
        WHEN jdata(n) - 53795  <# length prop
            &length - &prop(n)
        ENDWHEN
    ENDWHILE ERTRAP   LENGTH
    truelen - &length
    #LENGTH UNTRAP
    WHEN truelen - 0
        PRINT
``` unfldhrn Page 3

```
        PRINT  Error:  Miptr {$nlin} has length value of 0.
        e = -2
        RETURN
    ENDWHEN len = 0
    REPEAT FACTOR:i=2,1,i>nc
        len = MAGN(@coords(i-1).VSUB.@coords(i)) + len
    #FACTOR CONTINUE factor = truelen/len
<# PRINT DEBUG   length = {truelen}, factor = {factor}.
ENDWHEN lenseg = 0
len = 0
ang = 0

<#
<# First get drawmode coords for first coord.
<#
    @first = ACS2D(@coords(1),$view)

REPEAT GETANGS:i=2,1,i>nc lenseg = MAGN(@coords(i-1).VSUB.@coords(i)) * factor
    lenseg = ABS((AINT((lenseg*1000)+0.5))/1000)
<# PRINT DEBUG   lenseg = {lenseg}
<#
<# Now map these coords to draw mode
<#

@second = ACS2D(@coords(i),$view)

<#
<# Calculate angle in 3D
<#
    WHEN i = 2
        @p1=@last
        IF(MAGN(@coords(1)) < .01) @p1= VECT(-0.1,0,0)
        !* Before edit nlin.
        !EDIT NLIN : MIP {$nlin} X{XCOMP(@coords(1))}Y{YCOMP(@coords(1))}<#
>Z{ZCOMP(@coords(1))}, <#
    ELSE
        @p1=@coords(i-2)
    ENDWHEN
    @p2=@coords(i-1)
    @p3=@p2
    @p4=@coords(i)
    CALL GETANG(@p1,@p2,@p3,@p4,ang,nerr)
    ang = (AINT((ang*10)+0.5))/10
```

```
                        unfldhrn Page 4

WHEN nerr <> 0
              PRINT   flatten: Error resolving angle, assuming 0.
              ang = 0
              IF(XCOMP(@p2.VSUB.@p1) < 0) ang = 180
          ENDWHEN
<#    PRINT DEBUG ( {@p1}; {@p2}; {@p3}; {@p4}; {ang})
<#
<#  Now get the angle of the draw mode coords, and compare the angles.
<#

CALLP GETANG(@org1,@org2,@first,@second,dang,nerr)
          dang = (AINT((dang*10)+0.5))/10
          WHEN nerr <> 0
              PRINT   flatten: Error resolving drawing angle, assuming 0.
              dang = 0
              IF(XCOMP(@second.VSUB.@first) < 0) dang = 180
              PRINT  ( {@org1}; {@org2}; {@first}; {@second}, {dang} )
          ENDWHEN IF(dang > 90) dang = dang - 90
          @dang = @second .VSUB. @first
          x=XCOMP(@dang)
          y=YCOMP(@dang)

WHEN x < 0 .AND. y >= 0
              <# In second quadrant.
              dang = dang + 90
<# PRINT DEBUG   In second quad
          OR x < 0 .AND. y < 0
              dang = -90 - dang
<# PRINT DEBUG   In third quad
          OR x >= 0 .AND. y < 0
              <# In last quadrant
              dang = -dang
<# PRINT DEBUG   In last quad
          ELSE
              <# in first quadrant
              dang = dang
<# PRINT DEBUG   In first quad
          ENDWHEN <#  PRINT DEBUG   ang={ang}, lastang={lastang},last={last}, dang={dang}
          @first = @second <#
<#  compare this to lastang
<#
          WHEN lastang-dang > 180 .OR. lastang-dang < -180
              ang = -ang
          ENDWHEN WHEN j = 2
``` unfldhrn Page 5

```
        WHEN MAGN(@coords(1)) < .01
            IF(ang < 0) ang = -ang
            WHEN dang >= 0 .AND. dang <= 90
                IF(ang > 90) ang = ang - 90
            OR dang > 90
                IF(ang < 90) ang = ang + 90
            OR dang < -90
                IF(ang < 90) ang = 90 + ang
                ang = -ang
            OR dang <= 0 .AND. dang >= -90
                IF(ang > 90) ang = ang - 90
                ang = -ang
            ENDWHEN
            $line = LINE/@coords(1),ANGLE,ang,LENGTH,lenseg
            OBT/RECPTR=$line,COORDS,@line
<# PRINT DEBUG  ang = [ang]
            ! X[XCOMP(@line(2))]Y[YCOMP(@line(2))]Z0,<#
            last = ang
        ELSE
            WHEN dang >= lastang
                last = last+ang
                IF(lenseg < .001) lenseg = .01
                $line = LINE/@coords(1),ANGLE,last,LENGTH,lenseg
                OBT/RECPTR=$line,COORDS,@line
                ! X[XCOMP(@line(2))]Y[YCOMP(@line(2))]Z0,<#
            ELSE
                last = last-ang
                $line = LINE/@coords(1),ANGLE,last,LENGTH,lenseg
                OBT/RECPTR=$line,COORDS,@line
                ! X[XCOMP(@line(2))]Y[YCOMP(@line(2))]Z0,<#
            ENDWHEN
        ENDWHEN
        DELETE $line

ELSE

WHEN dang >= lastang
<#
<#          The angle is less, therefore rotate anticlockwise
<#
            !IR[lenseg]IA[ang], <#
            last = last + ang
        ELSE
            !IR[lenseg]IA[-ang], <#
            last = last - ang
        ENDWHEN
    ENDWHEN lastang = dang
GETANGS CONTINUE ! X[XCOMP(@coords(nc))]Y[YCOMP(@coords(nc))]Z[ZCOMP(@coords(nc))], <CR>
EXECDF
```

```
                    unfldhrn Page 6

<#
<#    Cause I'm not awfully brill at vector maths insert a line in line with
<#    the last vector, thyis will be used after rotating to re-align
<#    the affected entities.
<#
      i=1-1
<# PRINT DEBUG  i = {i}, e = {e}
      $entlist(e=:e+1)=LINE/@coords(i-1),@coords(i)

<#
<#    Now call moverel to move the related entities (in entlist) to the new
<#    position and orientation.
<#

<# PRINT DEBUG Calling moverel
      CALLP MOVEREL($nlin,$entlist,e,last,@last,lastang,trap,nc)

<#
<##################################################################################
``` tracloom Page 1

```
<# 11-28-90 mschnitg: first release
<#    CREATED  21-3-88 :   ACH (IAG)
<###########################################################
PROC TRACLOOM(nlin,nlb,nl)
<# PROC INITNET(nlin,nlb,nl,&ref,&segname,&harname,new,hn,ent,chlen)
<############################## HARN.c.cvmproc.initnet #######
<#
<# Expert     Andrew Hughes   (IAG)
<#
<# PURPOSE.
<#
<#   Initialises the network pattern array, which is used by the wire
<#   Router to find the path for wires through the nodal line network.
<#
<#   The user is prompted to digitise a central cnod. The network is
<#   then traced outwards from this point as follows.
<#
<#   first obtain the central cnod and extract the miptrs of anynodal
<#   lines. Put the nodal lines into element one of the array (nlin).
<#   put the cnod miptr into element 3, and the value of nlb into
<#   elenment 2. nl is incremented each time a nodal lin is found and
<#   added to the array, nl = array top pointer. when all nlins have been
<#   been found, increment nlb by 1. obtain the nodal line who's
<#   miptr is stored in nlin 1. extract the two related cnod's. one
<#   will be in nlin elem3, process the other. extract any nodal lines
<#   and add them into nlin as before, also callproc NFIGREF to extract
<#   the name of the associated nfig (if any) put this into &ref(nlb)
<#   Extract the value of the property length from the nodal line
<#   and put this into nlin(5).
<#
<#
<# CVMAC PROCEDURES CALLED:
<#
<#      gettprop - gets value of text prop from entity
<#      logger - updates log file
<#      getfnam
<#      nfigref
<#
<#
<# ARGUMENT LIST DECLARATIONS:
<#
       DECLARE REAL nlin(1,1),nlb,nl,new,hn,ent(32000)

<#
<# LOCAL VARIABLE DECLARATIONS:
<#
       DECLARE REAL cnset(10),int(30),length,lgt,cen
       DECLARE REAL c,f,h,i,lin,n,ncn,nint, error, j, nodnum
       DECLARE ENTITY $mip,$cen,$nlmip,$cnode
       DECLARE TEXT &stat,&nam,&rprop,&cen,&cnode,&lines,&h,&code
       DECLARE TEXT &lin(254),&length,&name,&spno, &val(254),&lgt,&fb
       DECLARE TEXT &esc(30:30),FGS,BGS,CUU,CLL,BCU,&win
<#
       DECLARE REAL hconnector,MLENGTH
<#
```

```
                           tracloom Page 2

<# ACH 1-5-90
      DECLARE REAL idata(20)                    <# Extracted prop numbers
      DECLARE REAL nprp                         <# No of props extracted
      DECLARE TEXT &prop(20:72)                 <# Extracted prop values
      DECLARE TEXT &newlen,&oldlen,&n,&temp
      DECLARE REAL lastlin,condist,
      DECLARE TEXT &plty
      DECLARE REAL l
      DECLARE REAL find
      DECLARE TEXT &pt
      DECLARE TEXT &ptno
      DECLARE TEXT &part
      DECLARE TEXT &ptcadds(254)
      DECLARE TEXT &cadds(254)
      DECLARE REAL tsk
      DECLARE TEXT &tsk
      DECLARE REAL ctrl
      DECLARE TEXT &eqnam
      DECLARE REAL harnlin
      DECLARE TEXT &create(254)
      DECLARE TEXT &ptunix(254)
      DECLARE TEXT &winno
      DECLARE TEXT &plt
      DECLARE TEXT &ptdir
      DECLARE TEXT &pltype(1000:30)
      DECLARE TEXT &std
      DECLARE REAL found
      DECLARE REAL b
      DECLARE REAL lines
      DECLARE REAL chlen
      DECLARE TEXT &nlb
      DECLARE TEXT &unit
      DECLARE TEXT &conlng(1000:72)
      DECLARE TEXT &cln
<#
<########################################################################
<#
<#
<# DATA INITIALISATION:
<#

<# 27-JUN-90 ACH   parameter 53 of param file switches controls on/off
  <# CALLP READPARM(4,&val,1,ctrl)

GETPRM (TASK) tsk
      &tsk = tsk
      ctrl = 0
      &ptdir = &create + "/"
<#        CHANGEID = 41024
      hconnector = 48640
      MLENGTH   = 53795
<#
<#  *************** START OF EXECUTABLE CODE  ****************
<#
   nl = 0
   hn = 1
``` tracloom Page 3

```
<#
<#     Turn off errtrapping.
  UNTRAP
   <# OBT/USE(MODEL,ENT=81,71)
   <# OBT/RECPOS=0,STATUS,&stat
<#
<#
<#
<#   This block may be used as an alternative to selecting the central
<#   CNOD by digitizing. The center cnod will be the one having a
<#   tag number of CENTER. If the CNOD does not exist the digitizing
<#   routine will be used.
<#
  #OBTAIN CONTINUE
  &cen = "CENTER"
  OBT/RECTAG=&cen,STATUS,&stat,CURMI,$cen
  cen  = $cen
  $mip = $cen
  IF   (cen <> 0) GOTO LOOP1
<#
  WHEN ctrl = 1
     <# UNIX BGS
     <# UNIX BCU
  ENDWHEN
#digcn  PRINT Please digitize a cnod to identify the center of the harness
<#
  ERTRAP digcn
 ! TAG ENT ENT CENTER : CNOD <VAR>
 !* In TRACLOOM
  EXECDF
  UNTRAP
  GOTO OBTAIN
  nlb = 0
<#
<# SET $mip TO $cen TO START PROCESSING.
<#
  $mip = $cen
  #LOOP1 CONTINUE
  WHEN (ctrl = 1)
     UNIX "echo      "+&win
     UNIX "echo Initializing network."+&win
     UNIX "echo "+&win
  ELSE
     PRINT
     PRINT   Initializing network.
     PRINT
  ENDWHEN
<#
<#  Start of tracing algorithm
<#

REPEAT

<#
<#
<#  OBTAIN THE CNOD. call GETTPROP to extract the hconnector prop.
``` tracloom Page 4

```
<#   Only call comp ref routines if prop exists, and first character
<#   is "C"
<#
        error = 0
        &rprop = ""
<# ACH Use GETPROP, extract all props from CNOD in one go.
<#
        CALLP GTPROP ($mip,idata,&prop,nprp,&pintex)
        &stop = ' '
        n = 0
        WHILE n =: n + 1 <= nprp
            WHEN idata(n) = 4101
                &stop = &prop(n)
            ENDWHEN
        ENDWHILE
<# 06-Aug-90 ACH: Extracting termnam & partno props to be added to
<# the segment file header
<#
<#
        OBT/RECPTR=$mip,IWANT,10,IGOT,nptr,SRECTYPE,128,IDATA,idata $nf = idata(3)
        <# PRINT DEBUG   nf = {$nf}
<#
<# get nodal line pointers and store unprocessed nlin's
<# Store connector data etc in arrays
<#
        WHEN &stop <> 'END'
            j = 0
            OBT/CURRENT,SRECTYPE,672,IGOT,nint,IDATA,int
                WHILE j =: j + 1 <= nint
                    WHEN int(j) <> 0
                        <#
                        <# ent stores the processed nodal line numbers.
                        <# Used to check if the nodal line has already been found.
                        <#
                        WHEN ent(int(j)) <> 1
                            nl = nl + 1
                            ent(int(j)) = 1
                            nlin(nl,1) = int(j)
                            nlin(nl,2) = nlb
                            nlin(nl,3) = $mip
                            <# WHEN condist > 0
                                <# nlin(nl,5) = condist    <# nlin length will be added
                            <# ENDWHEN
                        ENDWHEN
                    ENDWHEN
                ENDWHILE
            <# ELSE
                <# PRINT DEBUG    STOPPED. {nlb}, {nl}, {$mip}
        ENDWHEN
        WHEN nlb > 0
            nlin(nlb,4) = $mip
            nlin(nlb,6) = $nf
        ENDWHEN
        condist = 0
```

```
                    tracloom Page 5

<#
<# Move up nlin list until all done.
<#
        WHEN nlb < nl
                nlb     = nlb + 1
                $nlmip  = $MIPTR(nlin(nlb,1))
                OBT/RECPTR=$nlmip,IGOT,ncn,SRECTYPE,704,IDATA,cnset
                REPEAT CNSET:n=1,1,n > ncn
                        WHEN cnset(n) <> 0 .AND. cnset(n) <> nlin(nlb,3)
                                $mip = cnset(n)
                        ENDWHEN
                #CNSET CONTINUE
                nlin(nlb,5) = length
                &length = length
        ELSE
                GOTO END
        ENDWHEN
FOREVER
#END PRINT
<# REPEAT DEBUG:z=1,1,z>nl
  <# PRINT   [z],   [nlin(z,1)],[nlin(z,2)],[nlin(z,3)],[nlin(z,4)],[nlin(z,5)],<#
  <# PRINT   [nlin(z,6)].
<# #DEBUG CONTINUE
<# ... and added this loop to replace it.
``` moverel Page 1

```
<# ACH 22 May 91
<#
<#########################################################################
<#
    PROC MOVEREL($nlin,$entlist,e,last,@last,lastang,trap,nc)
<#
<#########################################################################
<#
<#
<#   Purpose.
<#
<#   This procedure recieves as arguments a nlin and cnod miptr, and a list
<#   of entities affected by any changes to the nlin.  The procedure flattens
<#   the nodal line onto cpl top retaining its original length and angles
<#   as closely as possible.
<#
<#   All of the entities at the end of the nodal line are then translated and
<#   rotated in order to maintain their relationship to the nodal line.
<#
<#
<#########################################################################
<#
<#   Declare arguments.
<#
    DECLARE ENTITY $cnod,$nlin,$entlist(1000)
    DECLARE REAL ents
    DECLARE LOCATION @last
<#
<#   Declaratiuonms
<#
    DECLARE LOCATION @coords(254)        <# Nodal line coords list.
    DECLARE LOCATION @new(254)    <# New coords of the nodal line.
    DECLARE LOCATION @temp1(2),@temp2(2),@temp3(2),@temp4(2),@line(2)
    DECLARE ENTITY $temp(4)
    DECLARE REAL ncoord
<#.
<#########################################################################
<#
<#
<#   Initialistaion
    WHILE trap = 0
       PRINT
       ERTRAP   TRAP
       PRINT    Please enter trap size to be used for filtering.
       PRINT
       READ  (    - >  )trap
       #TRAP CONTINUE
    ENDWHILE
    UNTRAP
<#
<#   Obtain the nodal line to get the new coords.
<#
``` moverel Page 2

```
   #OBT CONTINUE
    OBT/RECPTR=$nlin,IGOT,nnew,COORDS,@new
    WHEN nnew <> nc + 1
<#  !! In MOVEREL1
<#       EXECDF
         WHEN nnew = nc + 2
            !! FILTER ENT TRAP {trap} : MIP [$nlin} <CR>
            GOTO OBT
         ENDWHEN
    ENDWHEN <#
<# Revise all ents to line up with new position of end of nodal line.
<#
<# The translate element must move the ents directly away from the center
<# of rotation so that the distance is the same as the new position.
<#
<# the existing end point is @new(nnew), the point to be rotated to is
<# @new(nnew-1), The translate vector therefore is the unit vector defioned
<# by @new(1) -> @new(nnew), * diff in magnitude.
<#
    magnew= MAGN(@new(nnew-1).VSUB.@new(1))
    magold = MAGN(@new(nnew).VSUB.@new(1))
    @unit = UNIT((@new(nnew).VSUB.@new(1)))
    @vect = SCAL(@unit,(magnew-magold))

<#
<# The rotate component is defined by rotatiing about @new(1) from @new(nnew)
<# to @new(nnew-1)
<#
<#
    exec = 0

WHEN nnew > 2 .AND. MAGN(@vect) > trap
        !TRANSL ENT: MIP <#
        REPEAT TRAN:n=1,1,n>e
           ![$entlist(n)] <#
        #TRAN CONTINUE
        !;X0Y0Z0,X[XCOMP(@vect)]Y[YCOMP(@vect)]Z[ZCOMP(@vect)]
        exec = 1
    ENDWHEN @new(nnew) = @new(nnew).VADD.@vect
    WHEN MAGN(@new(nnew).VSUB.@new(nnew-1)) > trap
        !ROT ENT: MIP <#
        REPEAT ROT:n=1,1,n>e
           ![$entlist(n)] <#
        #ROT CONTINUE
        !;X[XCOMP(@new(1))]Y[YCOMP(@new(1))]Z[ZCOMP(@new(1))],<#
        X[XCOMP(@new(nnew))]Y[YCOMP(@new(nnew))]Z[ZCOMP(@new(nnew))],<#
        X[XCOMP(@new(nnew-1))]Y[YCOMP(@new(nnew-1))]Z[ZCOMP(@new(nnew-1))]
        !;X[XCOMP(@new(1))]Y[YCOMP(@new(1))]Z[ZCOMP(@new(1))],<#
        !X[XCOMP(@new(nnew))]Y[YCOMP(@new(nnew))]Z[ZCOMP(@new(nnew))],<#
        !X[XCOMP(@new(nnew-1))]Y[YCOMP(@new(nnew-1))]Z[ZCOMP(@new(nnew-1))]
        exec = 1
```

```
                    moverel Page 3

<# !  <^U>
     ENDWHEN

WHEN exec=1
   !* In MOVEREL 2
     EXECDF
  ENDWHEN

<#
  <#   Measure the angle between the original last segment and the new last
  <#   segment, then apply the appropriate rotation to the entities.
  <#

<#   Obtain the line inserted prior to rotation and get its coords, use these
  <#   to re-align the ents with the last vector.
  <#

OBT/RECPTR=$entlist(e),COORDS,@line
     DELETE $entlist(e)
     IF(exec = 1) e = e - 1

<# !  <^U>
     !ROTATE ENT : MIP <#
     REPEAT ROT2:n=1,1,n>e
        ![$entlist(n)] <#
     #ROT2 CONTINUE
     n=2
     IF(nnew<3) n = 1
     !;X{XCOMP(@new(nnew-1))}Y{YCOMP(@new(nnew-1))}Z{ZCOMP(@new(nnew-1))},<#
  >X{XCOMP(@line(1))}Y{YCOMP(@line(1))}Z{ZCOMP(@line(1))},<#
  >X{XCOMP(@new(nnew-n))}Y{YCOMP(@new(nnew-n))}Z{ZCOMP(@new(nnew-n))}
        <# !<^U>

<#
  <#   because the rotation and translation leaves extra coords in the nlin,
  <#   filter the little beastie.
  <#

UNTRAP
     ! FILTER ENT TRAP [trap] : MIP {$nlin} <CR>
     !* In MOVEREL 3
     EXECDF <#
  <#   now record angles for use with next part of branch.
  <#

@last=@new(nnew-n)
     @p3=@last
     @p4=@new(nnew-1)
     @p1=VECT(0,0,0)
     @p2=VECT(1,0,0)
     CALLP GETANG(@p1,@p2,@p3,@p4,last,nerr)
     WHEN YCOMP(@p4) < YCOMP(@p3)
        last = -last
     ENDWHEN
``` moverel Page 4

```
IF(nerr <>0)last=0
lastang = last
RETURN
```

```
                        main Page 1

<#  ACH 20 May 91
<#
<################################################################
<#
<#    Main program for unfold harness.
<#
<################################################################
<#
<#
<#    This program is used to unfold a 3D harness model onto CPL top, maintaining
<#    segment lengths and breakout angles where possible.
<#
<#    CADDS commands are first used to transalte the entities so that the center
<#    CNOD lies on x0y0zo, then raotae it so that the first vertex of the first
<#    nodal line lies along the X axis.
<#
<#    The harness network is traced and array is built that contains all of the
<#    items to be acted upon.
<#
<################################################################
<#
<#
<#    Declarations.
<#
      DECLARE REAL nlin(1000,6),nlb,nl,con,match(1000),ang(1000),dang(1000)
      DECLARE LOCATION @loc(200),@last(1000)
      DECLARE ENTITY $entlist(1000)

<#
<#
<################################################################
<#
<#    Start of code.
<#
      PRINT
      PRINT
      PRINT           HARNESS DESIGN UNFOLDING PROGRAM (Pat appl'd for).
      PRINT
      PRINT
<# Set up default database naming conventions
<# Check that /usr/tmp/_bcd exists and is accesible to this user
      CALLP FINDCHAN(chan)
      CALLP CHECKTMP(ok,&task,chan)
      WHEN ok=0
          PRINT You do not have the correct permission to write
          PRINT to /usr/tmp/_bcd.
          PRINT Please contact your System Administrator
          END
      ENDWHEN
<#
<#
<# Are we in an active part with an active drg
<#
      CALLP PARTNAME(&part,&drwnam,$cplnam,error)
      &prtnam=&part
``` main Page 2

```
<#
<# Check for error returns, abort if error found.
<#
    WHEN error < 0
        PRINT
        PRINT      Error No part or drawing active
        PRINT      Please activate and try again.
        PRINT
        PRINT      Aborting.
        PRINT
        END
    ENDWHEN
<#
<#
<# Call TRACLOOM to get list of everything and the relationships.
<#
    DATE &d,&start
    PRINT
    PRINT   Tracing harness network ....
    CALLP TRACLOOM(nlin,nlb,nl)

<#  i=o
<#  REPEAT SHOW:i=1,1,i>nl
<#  PRINT    [i], nlin = {nlin(i,1)},{nlin(i,2)},{nlin(i,3)},{nlin(i,4)},{nlin(i,5)}<
<#  >,{nlin(i,6)}
<#  #SHOW CONTINUE <#
<#  Obtain the coordinates of the center cnod.
<# j=1
    OBT/RECTAG='CENTER',COORDS,@loc

<#
<#  Move everything to put this CNOD at Z=0.
<#

<#
<#  Use CADDS to translate the model.
<#
    WHEN ABS(MAGN(@loc)) > .001
        PRINT
        PRINT   Translating model entities to required start location.
        PRINT   Please digitise view required for translation, then enter <CTRL-X>
        PRINT
        !TRANSLATE ENT : VWIN <VAR> , X{XCOMP(@loc)}Y{YCOMP(@loc)}Z{ZCOMP(@loc)},<#
    >   X0Y0Z0
        EXECDF
        PRINT
    ENDWHEN <#
<# Now obtain the first CNOD, get its firt vector and rotate everything to put
<# this onto the X Axis.
``` main Page 3

```
<#
      $mip = nlin(1,1)
      OPT/RECPTR=$mip,IWANT,2,COORDS,@loc
<#
<#    Run down the 'nlin' array, processing each nlin in turn.
<#
<#    Setup variables for CNOD and nlin being processed, and array of affected
<#    entities.
<#
<#    Start at nlin element 1.
<#
      nmatch = 1
      ptr = 0

REPEAT
         PRINT
         PRINT   Please digitise the view to be used for unfolding.
         PRINT
         DIGI(MLOC,VIEW,$view,1,n)i
      UNTIL n = 1

<#
<#    Check with the operator that the selected view is a TOP view.
<#
      PRINT
      PRINT   THE VIEW TO BE USED MUST BE A TOP VIEW AND MUST BE LARGE ENOUGH
      PRINT   TO CONTAIN THE UNFOLDED MODEL
      PRINT     Ensure that the view is set up correctly then enter <CTRL-X>...
      PRINT
      ! <VAR>
      ! SEL TRAP .001 mm
      ! ECHO ENT OFF NFIG CNOD TNOD
      ! SELECT SHADE OFF NOUPDATE
      EXECDF
<#
<#    Start processing.
<#
      PRINT
      PRINT   Unfolding started.
      PRINT REPEAT UNFOLD:ptr=1,1,ptr>nl
         $cnod = nlin(ptr,3)
         $nlin = nlin(ptr,1)
         match(1) = ptr
         nmatch = 1
         e = 0
         WHEN nlin(ptr,6) <> 0
            $entlist(e=:e+1) = nlin(ptr,6)
         ELSE
            $entlist(e=:e+1) = nlin(ptr,4)
         ENDWHEN
``` main Page 4

```
<#
<#  Build array of affected entities.
<#
    REPEAT GETENTS:i=ptr+1,1,i>nl j=0
        WHILE j=:j+1 <= nmatch
            WHEN nlin(i,2) = match(j)
                match(nmatch=:nmatch+1) = 1
                WHEN nlin(i,6) <> 0
                    $entlist(e=:e+1) = nlin(i,6)
                ELSE
                    $entlist(e=:e+1) = nlin(i,4)
                ENDWHEN
            ENDWHEN
        ENDWHILE
    #GETENTS CONTINUE
    WHEN nlin(ptr,2) > 0
        last = ang(nlin(ptr,2))
        @lastvec=@last(nlin(ptr,2))
        lastang = dang(nlin(ptr,2))
    ELSE
        @lastvec=VECT(0,0,0)
        lastang = 0
        last = 0
    ENDWHEN
    CALLP UNFLDHRN($view,$cnod,$nlin,$entlist,e,@lastvec,last,lastang)
    IF(last = 9999) GOTO FINISH
    @last(ptr) = @lastvec
    ang(ptr) = last
    dang(ptr) = lastang
#UNFOLD CONTINUE
#FINISH CONTINUE
! <^U>
!SEL TRAP 10 mm
!ECHO ENT ON NFIG TNOD CNOD
EXECDF
<# GETPRM (TASK) tsk
<# &tsk = tsk
<# &unix = 'rm /usr/tmp/$user.*.'+&tsk+'/'+&tsk+'/temp/_bcd/*'
<# PRINT DEBUG unix = {&unix}
<# UNIX &unix
DATE &d,&end
PRINT   Started at {&start};  finished at {&end};<#
PRINT      Date {&d(4,5)}-{&d(7,8)}-{&d(1,2)}.
PRINT
PRINT   Harness unfolding completed.
PRINT
READ ( <CR> to finish )&a
END
```

```
                        getang Page 1

<#
<#      13-09-89 SAR Updated to Rev 4 (ASIN)
<#      05-09-88 SAR ASIN bug radians need to be changed.
<#      14-07-88 SAR Vector bug added extra variables - Cat B.
<#      01-07-88 SAR Converted to CADDStation - Cat A.
<#      10-08-87 GS  Created.
<#
<############################################################
<#C
<#C     Computes the angle between two vectors defined by:-
<#C         1. Endpoints @p1 to @p2
<#C         2. Endpoints @p3 to @p4
<#C
<############################################################
<#
        PROC GETANG(@p1,@p2,@p3,@p4,theta,nerr)
<#
<#      INPUT
<#      @p1         - First point of first vector.
<#      @p1         - First point of first vector.
<#      @p1         - Second point of second vector.
<#      @p1         - Second point of second vector.
<#
<#      OUTPUT
<#      theta - Angle between two vectors.
<#      nerr        - Error number.
<#

DECLARE LOCATION @p1,@p2,@p3,@p4,@prod,@temp1,@temp3
        DECLARE VECTOR @vec1,@vec2
        DECLARE REAL maga,magb,magnorm,sint,theta,cost,nerr
<#
        <# @temp1=@p1
        <# @temp3=@p3
        nerr = 0
<#
        @vec1=@p2.VSUB.@p1
        @vec2=@p4.VSUB.@p3
        @prod=@vec1.VCROSS.@vec2
<#      PRINT FROM VECTOR........{@vec1}
<#      PRINT TO   VECTOR........{@vec2}
<#      PRINT VECTOR PRODUCT     ........{@prod}
        magnorm=MAGN(@prod)
        maga=MAGN(@vec1)
        magb=MAGN(@vec2)
<#
<#      Check For NULL input vectors
<#
      WHEN (maga.EQ.0.0.OR.magb.EQ.0.0)
        nerr=902   <# Zero length vector(s) in angle calculation
<#      PRINT DEBUG  A={maga}; B={magb}
        RETURN
      ENDWHEN
        sint=magnorm/(maga*magb)
        theta=ASIN(sint)
<#
``` getang Page 2

```
<#    CADDStation REV 3 bug - ASIN - result in radians.
<#
<#    theta=180*theta/3.14159265
<#
<#    USE THE DOT PRODUCT TO DETERMINE THE CORRECT QUADRANT
<#
      cost=DOT(@vec1,@vec2)/(maga*magb)
      IF (cost<0.0) theta=180.0-theta
<# PRINT ROTATION ANGLE (theta)
      RETURN
```

1. A computer implemented method for producing a two dimensional computer representation of a three dimensional wire harness which can be used to assemble the wire harness in two dimensions, the two dimensional computer representation being produced in an unfolding plane, the method comprising the computer implemented steps of:

generating a three dimensional computer representation of the three dimensional wire harness;

modeling at least one portion of the three dimensional computer representation as a plurality of computer modeled segments, the plurality of computer modeled segments including at least one computer modeled segment that lies outside the unfolding plane; and moving the at least one computer modeled segment that lies outside the unfolding plane into the unfolding plane to produce the two dimensional computer representation of the wire harness, including the computer implemented step of automatically processing the at least one computer modeled segment that lies outside the unfolding plane by rotation relative to an adjoining computer modeled segment.

2. The method of claim 1 further comprising the computer implemented step of establishing the unfolding plane as a best fit plane relative to the three dimensional computer representation.

3. The method of claim 1 further comprising the computer implemented step of establishing the unfolding plane as a plane that maximizes a number of the plurality of computer modeled segments lying in the unfolding plane.

4. The method of claim 1 further comprising the computer implemented step of checking a set of constraints after the at least one computer modeled segment is moved to determine whether a constraint is violated by moving the at least one computer modeled segment.

5. The method of claim 4 wherein the computer implemented step of modeling generates an at least one computer modeled portion that models the at least one portion of the three dimensional computer representation, and the computer implemented, step of checking the set of constraints includes checking a length parameter to ensure that the at least one computer modeled portion has a length substantially equal to the at least one portion of the three dimensional computer representation, the at least one computer modeled portion including at least two adjoining computer modeled segments.

6. The method of claim 5 wherein the computer implemented step of checking the length parameter includes checking a chord limit defined to represent a maximum distance that any point on any of the plurality of computer modeled segments can deviate from the at least one portion of the three dimensional computer representation.

7. The method of claim 4 wherein the computer implemented step of checking the set of constraints includes checking a twist limit parameter to limit the amount of twist that may be introduced into the plurality of computer modeled segments as the at least one computer modeled segment is rotated into the unfolding plane.

8. The method of claim 7 wherein the computer implemented step of checking the twist limit parameter includes checking the twist limit parameter defined as an angle of rotation per a specified unit of length measurement.

9. The method of claim 1 wherein the computer implemented step of modeling includes modeling the at least one portion of the three dimensional computer representation as a plurality of computer modeled straight line segments.

10. The method of claim 1 wherein the computer implemented step of modeling includes modeling each planar curve in the at least one portion of the three dimensional computer representation as a computer modeled segment.

11. The method of claim 1 wherein the computer implemented, step of modeling includes modeling a first portion of the three dimensional computer representation as a first plurality of computer modeled segments and modeling a second portion of the three dimensional computer representation as a second plurality of computer modeled segments, and wherein each computer modeled segment in the first plurality of computer modeled segments is moved into the unfolding plane prior to the step of modeling the second portion of the three dimensional computer representation as the second plurality of computer modeled segments.

12. The method of claim 1 further comprising the computer implemented step of providing the two dimensional computer representation of the wire harness in a human readable form which is usable for producing a form board drawing suitable for assembling the wire harness.

13. The method of claim 1, wherein the wire harness includes a plurality of junctions where at least three segments meet and a plurality of branches, a branch being a section of the wire harness having two ends that each terminates at either a junction or a connector that connects the wire harness to a component, the method further comprising the computer implemented steps of:

at each junction, determining whether a cycle exists, a cycle existing when two or more junctions and branches form a closed loop;

when a cycle exists, establishing a best fit plane relative to the junctions which define the cycle, the best fit plane for the cycle and the unfolding plane having an angle therebetween;

rotating the cycle relative to the unfolding plane by an amount equal to the angle between the unfolding plane and the best fit plane; and projecting any junctions in the cycle that do not lie in the best fit plane for the cycle onto the unfolding plane so that the lengths of the branches in the cycle prior to the step of rotating the cycle are substantially equal to the lengths of the branches in the cycle after the projecting step.

14. The method of claim 1, wherein the wire harness includes a plurality of junctions where at least three segments meet and a plurality of branches, a branch being a section of the wire harness having two ends that each terminates at either a junction or a connector that connects the wire harness to a component, the method further comprising the computer implemented steps of:

at each junction, determining whether a cycle exists, a cycle existing when two or more junctions and branches form a closed loop;

when a cycle exists, selecting a first branch in the cycle between two selected functions;

unfolding each branch in the cycle other than the first branch into the unfolding plane; and inserting a second branch that lies in the unfolding plane between the two selected junctions so that the second branch has a length substantially equal to the first branch.

15. The method of claim 1 further comprising the step of:

determining a start point; and the computer implemented step of:

rotating the start point so that a maximum number of the plurality of computer modeled segments adjacent the start point lie in the unfolding plane.

16. A computer implemented method for producing a two dimensional representation of a three dimensional wire harness having wires and/or bundles of wires for electrically coupling components within a product, the method comprising the computer implemented steps of:

generating a three dimensional computer representation of the three dimensional wire harness;

establishing a two dimensional unfolding plane;

modeling at least a portion of the wire harness as a plurality of computer modeled, segments that includes at least one computer modeled segment that lies outside the unfolding plane;

moving the at least one computer modeled segment that lies outside the unfolding plane into the unfolding plane, the moving step comprising the computer implemented steps of:

automatically processing the at least one computer modeled segment that lies outside the unfolding plane by rotation in a first direction relative to an adjoining computer modeled segment that lies in the unfolding plane, the at least one computer modeled segment and the adjoining computer modeled segment having an angle therebetween, wherein the angle remains the same before and after the rotation in the first direction;

determining whether an amount of twist introduced into the adjoining modeled segment exceeds a predetermined twist limit parameter that limits the amount of twist that may be introduced into a portion of the wire harness; and when the amount of twist introduced into the adjoining computer modeled segment exceeds the twist limit parameter, re-rotating the at least one computer modeled segment into the unfolding plane in a direction different from the first direction.

17. A computer implemented method for converting a three dimensional computer model of a wire harness into a two dimensional computer model of the wire harness for use in assembling the wire harness, the two dimensional computer model lying in a two dimensional unfolding plane, wherein the wire harness comprises a plurality of wires which interconnect components of a product, the wire harness having single wires and/or bundles of wires which have branches that meet at junctions, a branch being a part of the wire harness which has both ends terminated by either a junction or a connector for connection to one of the components, the method comprising the computer implemented steps of:

(a) modeling a portion of a branch as a plurality of computer modeled segments represented by computer data, the portion including part or all of the branch;

(b) unfolding the portion of the branch by transforming the computer data representing each of the plurality of computer modeled segments into a transformed representation so that the transformed representation of each computer modeled segment lies in the unfolding plane to result in a computer modeled unfolded portion;

(c) automatically checking a predetermined constraint to determine whether the computer modeled unfolded portion violates the predetermined constraint;

(d) when the computer modeled unfolded portion violates the predetermined constraint, adjusting the computer data until the computer modeled unfolded portion no longer violates the predetermined constraint; and (e) repeating steps (a)–(d) on each portion of each branch until the transformed representations of all the branch portions lie in the unfolding plane.

18. The method of claim 17 further comprising the computer implemented steps of:

at each junction, determining whether a cycle exists, a cycle existing when two or more junctions and branches form a closed loop;

when a cycle exists, establishing a best fit plane relative to the junctions which define the cycle, the best fit plane for the cycle and the unfolding plane having an angle therebetween;

rotating the cycle relative to the unfolding plane by an amount equal to the angle between the unfolding plane and the best fit plane; and projecting any junctions in the cycle that do not lie in the best fit plane for the cycle onto the unfolding plane so that the lengths of the branches in the cycle prior to the step of rotating the cycle are substantially equal to the lengths of the branches in the cycle after the projecting step.

19. The method of claim 17 further comprising the computer implemented steps of:

at each junction, determining whether a cycle exists, a cycle existing when two or more junctions and branches form a closed loop;

when a cycle exists, selecting a first branch in the cycle between two selected junctions;

unfolding each branch in the cycle other than the first branch into the unfolding plane; and inserting a second branch to lie in the unfolding plane between the two selected junctions so that the second branch has a length substantially the first branch.

20. The method of claim 19 wherein the computer implemented step of inserting a second branch comprises altering angles in at least two of the branches in the cycle other than the first branch.

21. The method of claim 17 wherein the computer implemented step of unfolding the portion of the branch includes rotating at least one computer modeled segment relative to an adjacent computer modeled segment.

22. The method of claim 21 wherein the predetermined constraint is a twist limit parameter, and wherein step (c) includes the computer implemented step of comparing the computer modeled unfolded portion to the twist limit parameter to limit an amount the computer modeled segment may be rotated relative to the adjacent computer modeled segment.

23. The method of claim 22 wherein the step of comparing includes comparing the twist limit parameter defined as an angle of rotation per a unit of length.

24. The method of claim 22 further comprising, for each computer modeled segment which is rotated relative to an adjacent computer modeled segment, the computer implemented steps, of:

determining an amount of twist introduced in the adjacent computer modeled segment; and comparing the amount of twist to the twist limit parameter.

25. The method of claim 24 further comprising the computer implemented step of summing the twist for a plurality of computer modeled segments in the branch.

26. The method of claim 24 wherein the computer implemented step of unfolding includes moving each computer modeled segment relative to an adjacent computer modeled segment so that an angle between the computer modeled segment and the adjacent computer modeled segment prior to and after being moved into the unfolding plane are substantially equal.

27. The method of claim 17 wherein step (a) includes the computer implemented step of modeling the plurality of computer modeled segments as straight line segments.

28. The method of claim 27 wherein the predetermined constraint is a length parameter, and wherein step (c) includes the computer implemented step of checking the length parameter to ensure that the computer modeled branch is substantially equal in length to corresponding branch prior to the step of modeling.

29. The method of claim 17 wherein the computer implemented step of modeling a portion of a branch includes modeling at least one of the plurality of computer modeled segments as a planar curve.

30. The method of claim 17 wherein the computer implemented step of modeling a portion of a branch includes modeling at least one of the plurality of computer modeled segments as a straight line.

31. The method of claim 22 wherein the step of comparing the computer modeled unfolded portion to the twist parameter includes the computer implemented step of comparing the twist limit parameter based on a minimum length over which one or more of the plurality of computer modeled segments can be twisted 180°.

32. The method of claim 22 wherein the step of comparing the computer modeled unfolded portion to the twist limit parameter includes comparing the twist limit parameter based on a single value for the entire wire harness.

33. The method of claim 22 wherein the step of comparing the computer modeled unfolded portion to the twist limit parameter includes comparing the twist limit parameter based on the smallest amount of allowable twist for any wire or bundle in the wire harness.

34. The method of claim 22 wherein the step of comparing the computer modeled unfolded portion to the twist limit parameter includes comparing the twist limit parameter based on the diameter of the wire or bundle of the wire harness which is being modeled.

* * * * *